United States Patent [19]

Gleeson et al.

[11] Patent Number: 5,627,829

[45] Date of Patent: May 6, 1997

[54] METHOD FOR REDUCING UNNECESSARY TRAFFIC OVER A COMPUTER NETWORK

[76] Inventors: Bryan J. Gleeson, 19400 Sorensen Ave. #206, Cupertino, Calif. 95014; Paulette R. Altmaier, 22605 Salem Ave., Cupertino, Calif. 95014

[21] Appl. No.: 482,929

[22] Filed: Jun. 6, 1995

Related U.S. Application Data

[63] Continuation of Ser. No. 133,513, Oct. 7, 1993, Pat. No. 5,446,736.

[51] Int. Cl.⁶ .................................................. H04L 12/66
[52] U.S. Cl. ......................... 370/230; 370/349; 370/401; 370/469
[58] Field of Search .................................. 370/94.1, 94.2, 370/60, 60.1, 85.13, 85.14, 85.15, 118, 58.1, 58.2, 58.3; 340/825.5, 825.51, 825.02

[56] References Cited

U.S. PATENT DOCUMENTS

| | | | |
|---|---|---|---|
| 4,517,669 | 5/1985 | Freeburg et al. | 370/82 |
| 5,214,646 | 5/1993 | Yacoby | 370/85.13 |
| 5,231,633 | 7/1993 | Hluchyj et al. | 370/60 |
| 5,235,595 | 8/1993 | O'Dowd | 370/94.1 |
| 5,295,154 | 3/1994 | Meier et al. | 370/60 |

*Primary Examiner*—Douglas W. Olms
*Assistant Examiner*—Ajit Patel
*Attorney, Agent, or Firm*—Knobbe, Martens, Olson & Bear, L.L.P.

[57] ABSTRACT

Standard protocols, such as those commonly used on LAN networks, are used to connect nodes to an enterprise network via a wide area wireless network. Within the appropriate protocol stacks, the standard protocols are optimized by filtering some packets, eliminating and reducing the size of other fields and substituting still other fields to reduce the size of the data packets. The optimized data packets can be transmitted over the wireless WAN increasing WAN efficiency. The optimization is accomplished by inserting an additional optimization layer into the protocol stack between the existing layers. The optimization layer accepts the normal protocol signals generated by the surrounding layers and generates outputs which mimic protocol layers which the surrounding layers expect. Consequently, the optimization layer operates transparently with respect to the existing protocol stack layers.

20 Claims, 21 Drawing Sheets

METHOD FOR REDUCING UNNECESSARY TRAFFIC OVER A COMPUTER NETWORK

This application is a continuation of U.S. patent application Ser. No. 08/133,513, filed Oct. 7, 1993, now U.S. Pat. No. 5,446,736.

FIELD OF THE INVENTION

This invention relates generally to data device networks and, in particular, to apparatus and methods for connecting nodes to wireless networks usibg standard network protocols.

BACKGROUND OF THE INVENTION

With the tremendous growth of data processing by means of independent localized data processing devices, such as personal computers and minicomputers, data networks have evolved to connect together physically separated devices and to permit digital communication among the various devices connected to the network.

There are several types of networks, including local area networks (LANs) and wide area networks (WANs). A LAN is a limited area network and the data devices connected to a LAN are generally located within the same building. The LAN typically consists of a transmission medium, such as a coaxial cable or a twisted pair which connects together various computers, servers, printers, modems and other digital devices. Each of the devices, which are collectively referred to as "nodes", is connected to the transmission medium at an address which uniquely identifies the node and is used to route data from one node to another.

The WAN is used to connect devices together which are located at distances that are typically larger than the distances spanned by LANS. WAN networks often utilize existing public telephone networks and, thus can connect nodes located at great distances.

LANs and WANS are often connected together in various configurations to form "enterprise" networks which may span different buildings or locations or extend across an entire continent. Enterprise networks are convenient for several reasons: they allow resource sharing —programs, data and equipment are available to all nodes connected to the network without regard to the physical location of the resource and the user. Enterprise networks may also provide reliability by making several redundant sources of data available. For example, important data files can be replicated on several storage devices so that, if one of the files is unavailable, for example, due to equipment failure, the duplicate files are available.

In enterprise networks information to be sent from one node to another is generally divided into discrete messages or "packets" and the packets are transmitted between nodes in accordance with a predefined "protocol". In this context a "protocol" consists of a set of rules or procedures defining how the separate nodes are supposed to interact with each other.

In order to reduce design complexity, most networks are organized as a series of "layers" or "levels" so that information passing from one node to another is transmitted from layer to layer. Within each layer, predetermined services or operations are performed and the layers communicate with each other by means of predefined protocols. The purpose for the layered design is to allow a given layer to offer selected services to other layers by means of a standardized interface while shielding those layers frown the details of actual implementation within the layer.

In an attempt to standardize network architectures (the overall name for the sets of layers and protocols used within a network), a generalized model has been proposed by the International Standards Organization (ISO) as a first step towards international standardization of the various protocols now in use. The model is called the open systems interconnection (OSI) reference model because it deals with the interconnection of systems that are "open" for communication with other systems. The proposed OSI model has seven layers which are termed (in the order which they interface with each other) the "physical", "data link", "network", "transport", "session", "presentation" and "application" layers. The purpose of the OSI model is to attempt to standardize the processes conducted within each layer.

In accordance with the OSI model, the processes carried out in the physical layer are concerned with the transmission of raw data bits over a communication channel. The processes carried out in the data link layer manipulate the raw data bit stream and transform it into a data stream that appears free of transmission errors. The latter task is accomplished by breaking the transmitted data into data frames and transmitting the frames sequentially accompanied with error correcting mechanisms for detecting or correcting errors.

The network layer processes determine how data packets are routed from the data source to the data destination by selecting one of many alternative paths through the network. The function of the transport layer processes is to accept a data stream from a session layer, split it up into smaller units (if necessary), pass these smaller units to the network layer, and to provide appropriate mechanisms to ensure that the units all arrive correctly at the destination, with no sequencing errors, duplicates or missing data.

The session layer processes allow users on different machines to establish "sessions" or "dialogues" between themselves. A session allows ordinary data transport between the communicating nodes, but also provides enhanced services in some applications, such as dialogue control, token management and synchronization. The presentation layer performs certain common functions that are requested sufficiently often to warrant finding a general solution for them, for example, encoding data into a standard format, performing encryption and decryption and other functions. Finally, the application protocol layer contains a variety of protocols that are commonly needed, such as database access, file transfer, etc.

The layers are arranged in order to form a protocol "stack" for each node and the stacks are connected together at the physical level end. Thus, data transmission through the network consists of passing information down through one stack across the physical communication link to another protocol stack and passing the information up the other stack to the second node.

While the enterprise network works well, the recent proliferation in small portable data processing devices has lead to the rapid evolution of the wireless WAN network which can connect small mobile terminals to a land-based station and, in turn, to one or more enterprise networks. A typical architecture of a wireless WAN network comprises a number of mobile terminals connected by radio links to a base station. The base station is then, in turn, connected to a host computer or to an enterprise network by means of land lines.

Since wireless WAN networks involve at least one radio link, they exhibit characteristics of relatively low bandwidth and throughput when compared to ordinary enterprise networks. In addition, due to the large error rates involved in the radio link and the consequent necessity for retransmissions, the latency of the wireless network (the time which is taken to transmit a signal from one data transmission terminal to another and return an acknowledgement) is also quite high. Due to these characteristics, it has been found that it is inefficient, and in some cases, impossible to use standard communications protocols used in enterprise networks over wireless wide area networks. In particular, attempts to use common enterprise network protocols which were typically designed for much faster networks have resulted in excessive network traffic over the wireless WAN.

The conventional solution to this problem is to use specialized protocols for those networks which involve connections between a wireless network and various nodes. However, when specialized protocols are used, the protocol is often dependent on the exact network configuration. Significant additional development time is then often required to connect nodes to wireless WANs because custom protocol converters or gateways are needed. In addition, the use of specialized protocols often means that end-to-end reliable communication services are not available. Finally, existing network applications must often be reworked in order to utilize the specialized protocols.

Consequently, a method and apparatus is needed for networks which involve wireless WANs which method and apparatus will allow the use of standardized protocols to interface nodes with the wireless network while taking into account the special characteristics of the wireless WAN.

Further, tire method and apparatus must operate transparently with respect to both application programs in the nodes and the wireless network. Such a method will allow existing application programs to be used unmodified with the wireless network.

SUMMARY OF THE INVENTION

The foregoing problems are solved and the foregoing objects are achieved in accordance with illustrative embodiments of the invention in which standard protocol stacks, such as those commonly used on enterprise networks, are used to interface each node to the wireless network. Within the appropriate protocol stacks, the standard protocols are optimized by filtering and discarding some protocol packets, generating and "synthesizing" the reception of other protocol packets, and removing and transforming protocol header fields. The optimized protocol stream can be transmitted over the wireless WAN without seriously affecting WAN efficiency.

The optimization is accomplished by inserting an additional optimization layer between, the standard protocol stack and the wireless network driver. The optimization layer accepts normal inputs from the protocol stack and the driver and generates outputs which appear to the protocol stack to have come from a standard network driver and to the wireless network driver to have come from a wireless protocol stack. Consequently, the optimization layer operates transparently with respect to the existing stack and driver and both the stack and the driver behave as if they were operating in the environment for which they were designed.

The data packet stream passing through the standard protocol stack is converted in the optimization layer to the wireless protocol stream using the aforementioned optimizations. In particular, in accordance with one embodiment of the invention, the optimization layer reduces the number and size of data packets transferred over the wireless network by intercepting and interpreting the data packets before transmission over the network. The interpretation process includes filtering and discarding of data packets, generating and synthesizing the reception of data packets and removing or transforming selected protocol header fields.

In accordance with another embodiment of the present invention, the data packets are optimized as previously discussed and, in addition, conventional data compression is applied to both the reduced headers and the data in each data packet.

The reduction in the number of packets, the header size and the data compression reduces the amount of data which must be sent over to the wide area network to the point where the network traffic is sufficiently minimized for efficient use of the wireless WAN network.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
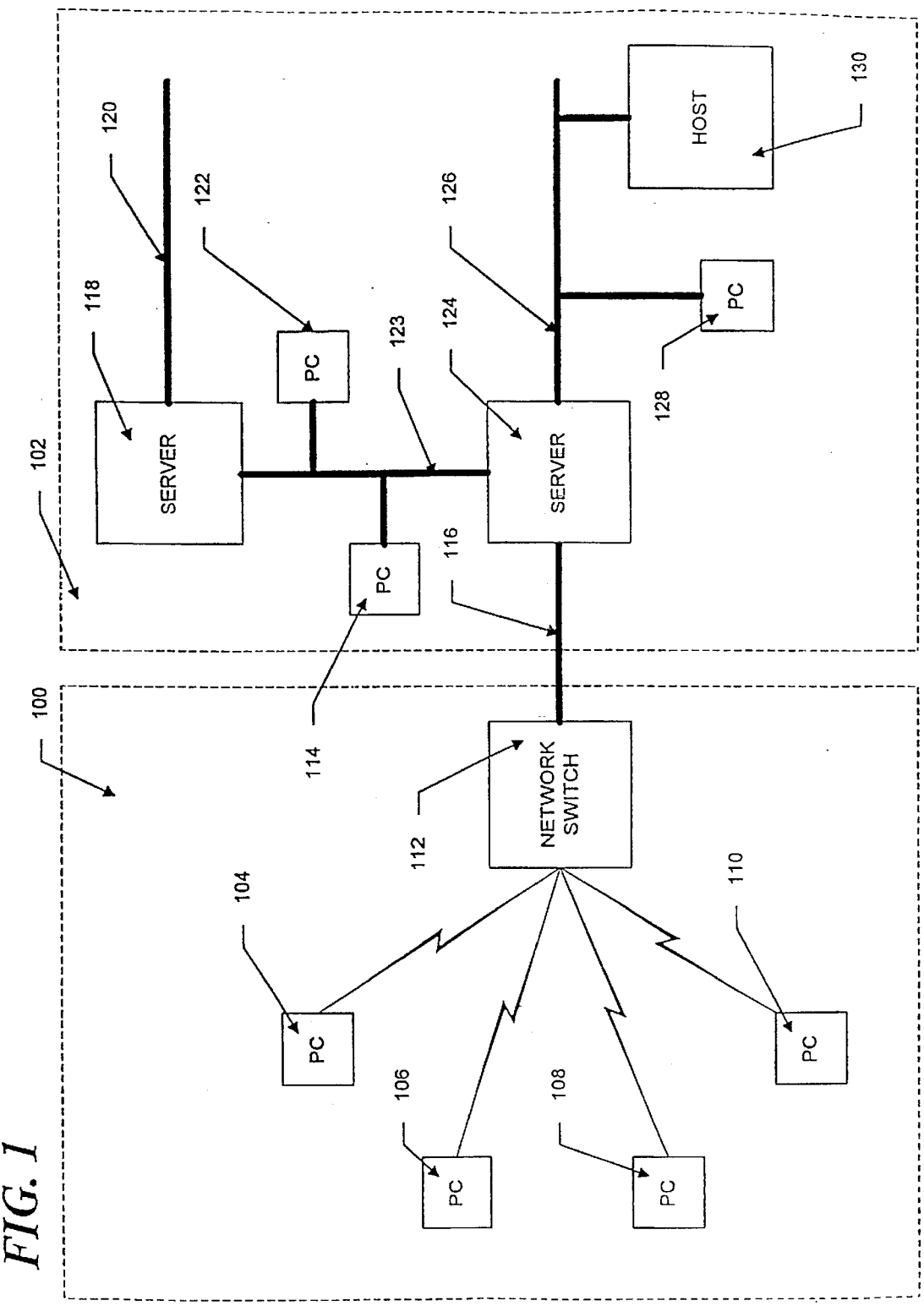
FIG. 1 is a block schematic diagram of a wireless WAN connected to a LAN-based enterprise network in accordance with the inventive principles, with each network including a variety of nodes.

FIG. 1 illustrates, in schematic fashion, a wireless WAN, schematically designated by dotted box 100, connected to a LAN-based enterprise network schematically illustrated by dotted box 102. The wireless WAN consists of a plurality of client nodes, such as mobile PCs, of which PCs 104–110 are illustrated. PCs 104–110 communicate over a radio link with a base station (not shown) and a network switch 112. The network switch 112 is, in turn, connected, via a land link 116, to a server 124 which is part of enterprise network 102. Enterprise network 102 consists of various segments, including segments 120, 123 and 126. Segments 120 and 123 are connected by a server 118; segments 123 and 126 are connected by a server 124. Each segment may have various data utilization devices attached. For example, PC computers 114 and 122 are connected to segment 123 and PC 128 and host 130 are connected to segment 126.

The mobile PCs 104–110 communicate with the network switch 112 by means of radio packet modems (not shown) which are conventional devices. The network switch 112 is connected to the enterprise network server 124 over a communication link 116 using any one of a number of conventional protocols, for example, the well-known X.25 protocol. In accordance with the inventive principles, the data packets may be compressed using a lossless compression algorithm at the client nodes and sent, via the network switch 112, over the X.25 link 116 to the server node 124 where the packets are decompressed and sent to the remainder of the network. Similarly, data packets sent to server 124 by the remainder of the enterprise network 102 which packets are destined for any of the mobile clients 104–110 are compressed by server 124, sent over the transmission link 116 and transmitted by the wireless network to the selected client. The client then decompresses the packets.

There are several types of communications that can occur in a combined network, such as that shown in FIG. 1. First, one of mobile client nodes 104–110 may communicate with another mobile client node —for example, PC 104 may communicate through the network switch 112 to PC 106.

Alternatively, one of the client nodes connected to the enterprise network, for example node 122, may communicate with another node on the enterprise network, for example node 128, via server node 124. Node 122 may also communicate with host node 130 via server node 124.

Further, node 104 on the wireless WAN 100 may also communicate through network switch 112 and server node 124 with node 122 on the enterprise network 102.

Figure 2:
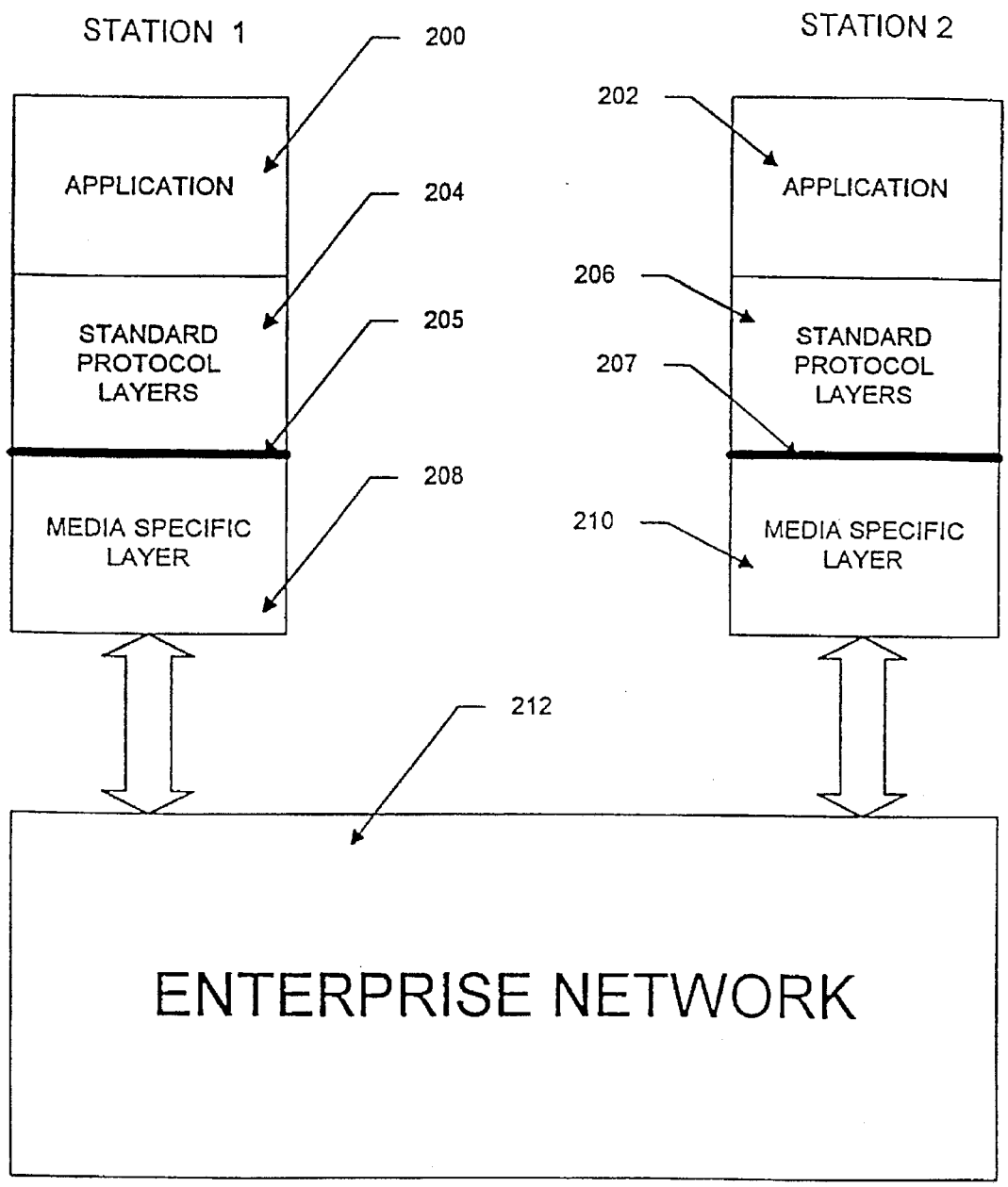
FIG. 2 is a block schematic diagram network of prior art protocol stacks used to transmit information between two nodes over a LAN.

As previously mentioned, these communications and other generalized network connections can be modeled as a "protocol stack" of layers in which selected data processing operations are performed in each layer and the layers communicate via standard protocols. FIG. 2 is an illustrative protocol stack modeling a connection established between two nodes located on the enterprise network 102, for example nodes 114 and 122. Node 114, or STATION 1, interfaces with the enterprise network 212 by means of the protocol stack consisting of layers 200, 204 and 208. The first layer is the application layer 200 which, as previously mentioned, handles protocols and interface information that directly communicate with a client application program running at the station.

Application layer 200, in turn, interfaces with standard protocol layers 204 where the protocols used in these layers are generally determined by the LAN and are standard for each type of network. The standard protocol layers provided by the network, in turn, communicate with media specific layer 208 through a standard interface layer 205 which is independent of the exact physical characteristics of the enterprise network 212.

At the second station, the information coming over the enterprise network 212 is provided to a media specific layer 210 which is analogous to layer 208. Layer 210, in turn, interfaces, over a standard interface 207, with standard protocol layers 206 which again are determined by the network to which STATION 2 is connected and are analogous to layers 204. Finally, the information passes to the application layer 202 which directly interfaces with the application program running in the second node, STATION 2.

It is important to note that, in the configuration illustrated in FIG. 2, the protocols used to provide communication services used by the client application programs are provided by standard protocol layers and transmission over a particular medium is handled by the media specific layer which does not directly communicate with the application program. Thus, as long as the network defined protocols are compatible with the underlying media, the application program needs to be written only to communicate with the standard protocols regardless of the actual media in use. In addition, the standard protocol layers do not need to be "aware" of the specific physical medium because they interface the media-specific layer through a standard interface.

Figure 3:
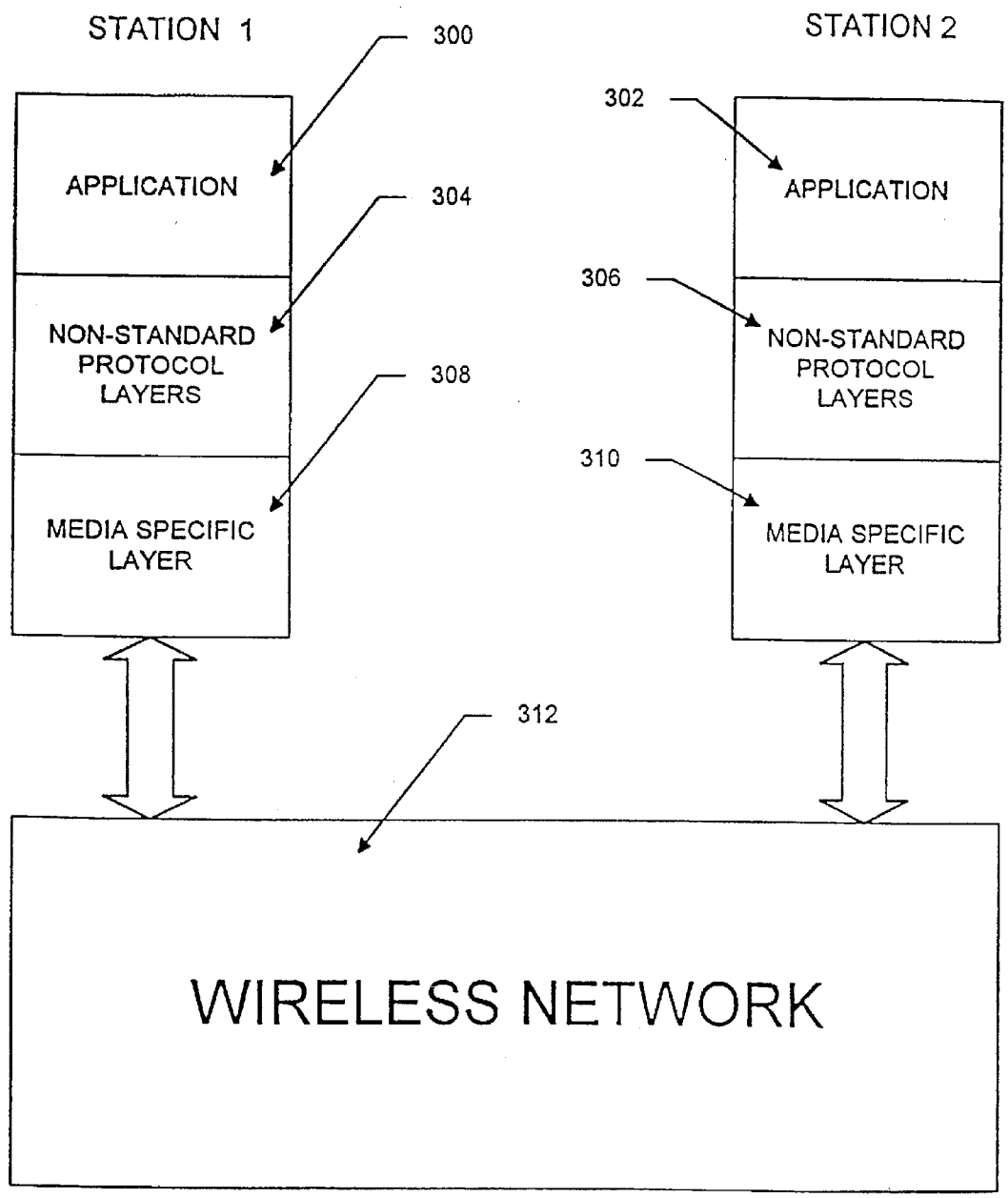
FIG. 3 is a block schematic diagram of prior art protocol stacks used to transmit data information between two nodes over a wireless WAN.

However, as previously mentioned, the FIG. 2 arrangement assumes that the network protocols are compatible with the transmission media; if the standard network protocols are not compatible with the underlying media, then the arrangement illustrated in FIG. 2 either will not operate properly or will use the underlying medium inefficiently. In this situation, specialized protocols have conventionally been used. FIG. 3 illustrates a typical prior art layered configuration used when two nodes communicate via a wireless WAN. Such a connection may, for example, occur during communications between two nodes located on wireless WAN 100, such as nodes 104 and 106, or may also occur when a server node, such as server node 124, which is connected to WAN 100, communicates with a node on the wireless network such as node 104.

As with the previous layered arrangement, the protocol stack for STATION 1 includes an application layer 300 which communicates directly with the application program running in STATION 2. Application layer 300 then communicates with a protocol layer 304, however, in order to insure that the wireless network is used efficiently, non-standard wireless network specific protocol layers are used to provide the communication services used by the application. These non-standard layers then communicate a media-specific layer 308 which, in turn, communicates directly with the wireless network 312.

At STATION 2, the information from the wireless network communicates with the media-specific layer 310 which then communicates with non-standard protocol layers 306. The non-standard protocol layers 306, in turn, communicate with application layer 302.

As previously mentioned the non-standard wireless specific protocol layers, 304 and 306, are the source of many drawbacks since they are specific to the particular wireless network that is being used. For example, applications designed for standard LAN networks will generally not operate on the wireless networks because the protocols are not compatible and, thus, each application program must be modified to operate with the particular non-standard protocol layer used on a given network. Also, existing communications equipment (for example, routers) used in enterprise networks does not recognize these protocols. Finally, end-to-end reliable communications cannot be achieved if the enterprise network equipment does not support the non-standard protocol.

Figure 4:
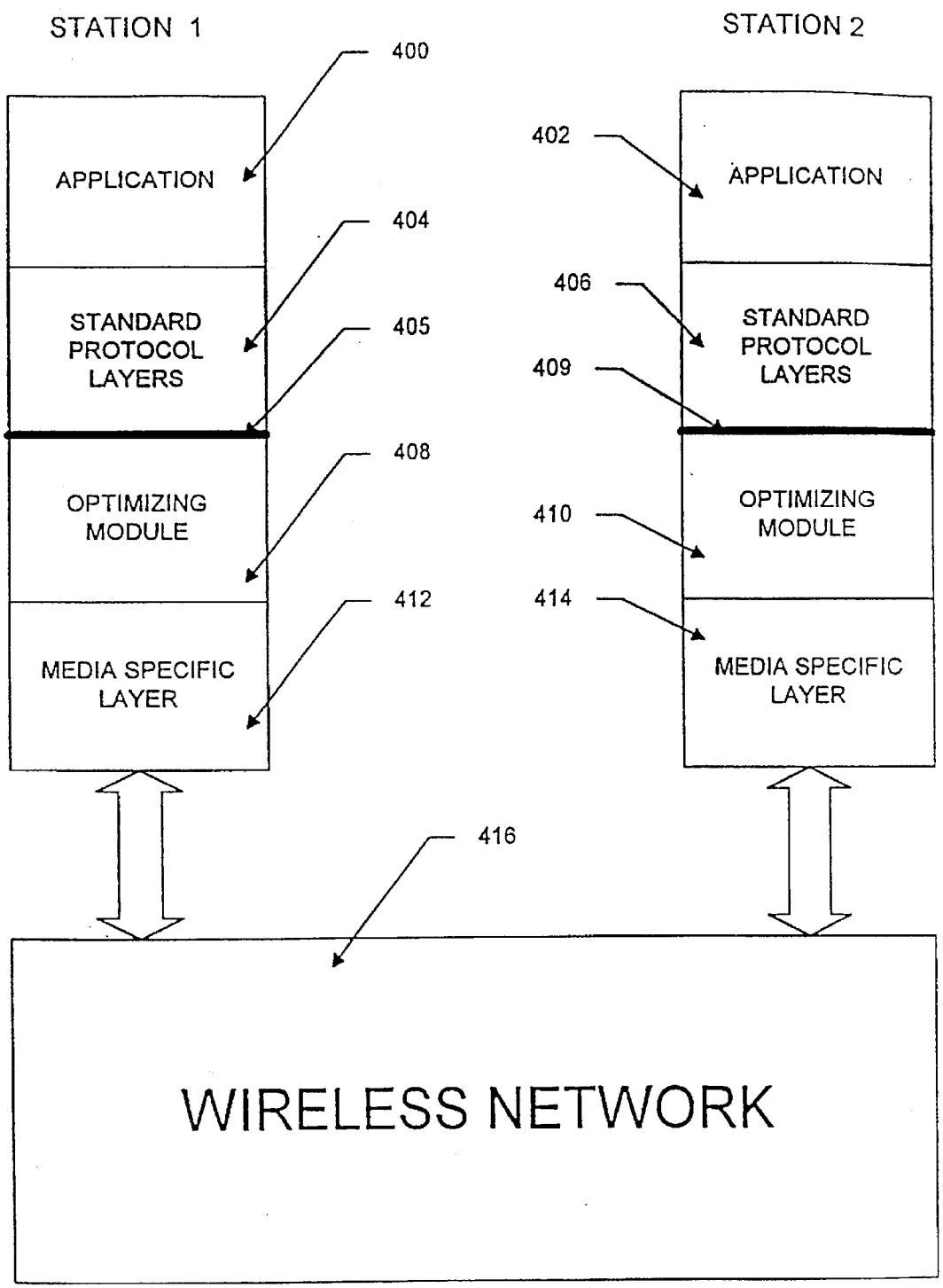
FIG. 4 is a block schematic diagram of the protocol stacks used to transmit data information between two nodes over a wireless WAN and modified in accordance with the present invention to include an optimization layer.

FIG. 4 illustrates a protocol stack used for communication over a wireless WAN which communications stack has been modified in accordance with the present invention. As with the prior art arrangement of FIG. 3, STATION 1 has an application layer 400. However, in this modified stack, application layer 400 interfaces with standard protocol layers 404, in an analogous manner to FIG. 2. These standard protocol layers may be the same protocol used on LAN networks and, thus, the same application can be connected to both a LAN network as well as a wireless WAN without modification.

In accordance with the invention, the standard protocol layers 404 interface with the lower layers through the standard interface 405. The invention inserts an optimizing layer 408 transparently between the standard protocol layer 404 and the media specific layer 412. The optimizing layer 408 interfaces to the standard protocol layers 404 through the standard interface 405 and converts the standard protocol stream into an optimized protocol stream which is suitable for transmission over the wireless WAN 416. The optimizing layer 408, in turn, interfaces with a media specific layer 412 which actually communicates with the wireless network 416.

At STATION 2, a media specific layer 414 interfaces with the wireless network 416. The media specific layer 414, in accordance with the invention, interfaces with a second optimizing layer 410 which converts the optimized protocol stream received over the wireless network 416 into a standardized protocol stream which is suitable for use with the standard protocol layers 406 through standard interface 409. Protocol layers 406, in turn, interface with application layer 402 at STATION 2.

As previously mentioned, data communications protocols are characterized by the exchange of protocol data units (PDUs) between protocol stacks and each optimizing layer 408 and 410 reduces the number and size of PDUs transferred over the wireless network by intercepting and interpreting the PDU's being sent. This interpretation process includes filtering and discarding PDUs, generating and synthesizing the reception of PDUs, removing or transforming protocol header fields and other traffic optimization techniques such as compressing the data. These operations make it feasible to use the standard protocols over the wireless network.

Since both application layers 400 and 402 interface only with standard protocol layers, the applications do not have to be reworked if they are connected to a LAN or a wireless network. In addition, since the standard protocol layers 404 and 406 interface only with the standard interface 405, they do not have to be reworked to run over different underlying transmission media. However, since the wireless network 416 sees only the optimized information, it operates efficiently as if non-standard protocol layers had been used.

More specifically, the optimizing layers 408 and 410 are designed in such a manner that the interface between layers 408 and 410 and standard protocol layers 404 and 406, respectively, is the same as if layers 404 and 406 were connected directly to media specific layers 412 and 414. Similarly, the interface between layers 408 and 410 and media specific layers 412 and 414 is the same as if layers 412 and 414 were connected directly to standard protocol layers 404 and 406, respectively. Therefore the optimizing layers 408 and 410 can be inserted into the protocol stack without changing either the standard protocol layers 404 and 406 or the media specific layers 412 and 414 and the operation of the optimizing layers is completely transparent to the network system.

Figure 5:
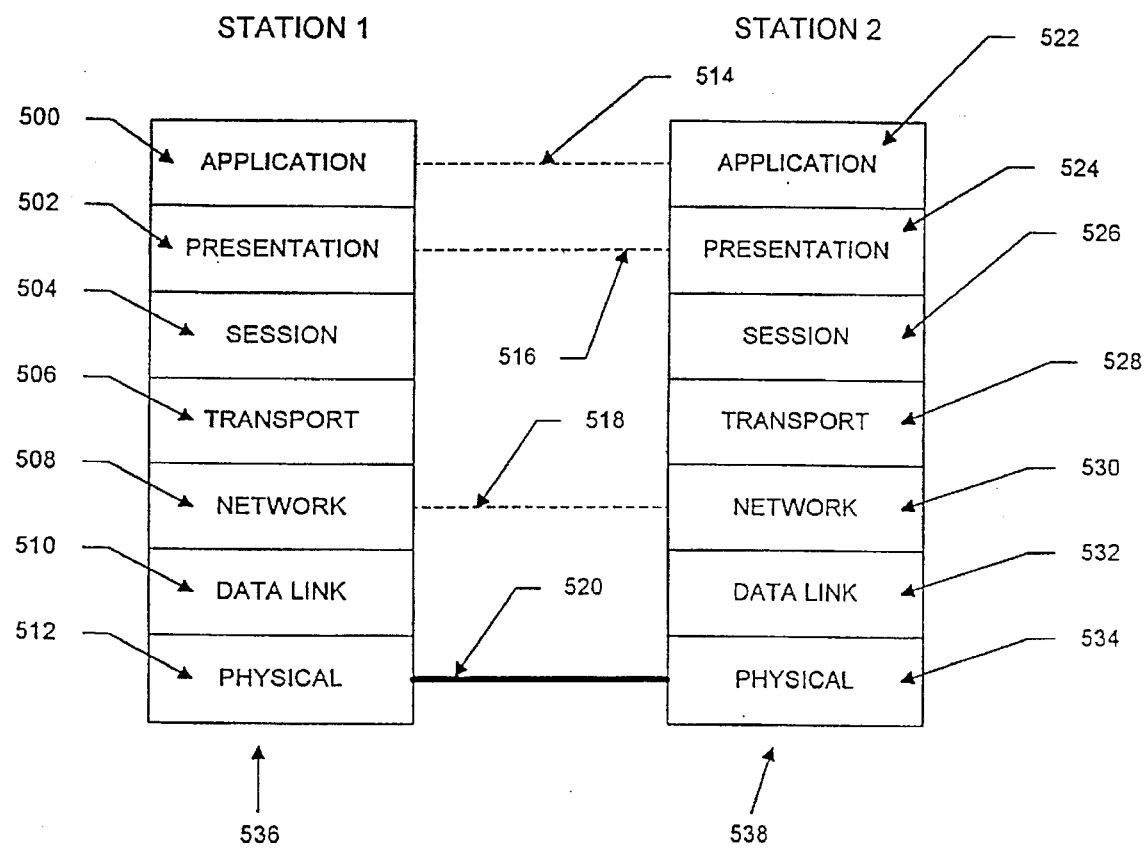
FIG. 5 is a more detailed block schematic diagram of prior art protocol stacks used to transmit data between two nodes structured in accordance with the international standards organization OSI seven-layer model.
Figure 6:
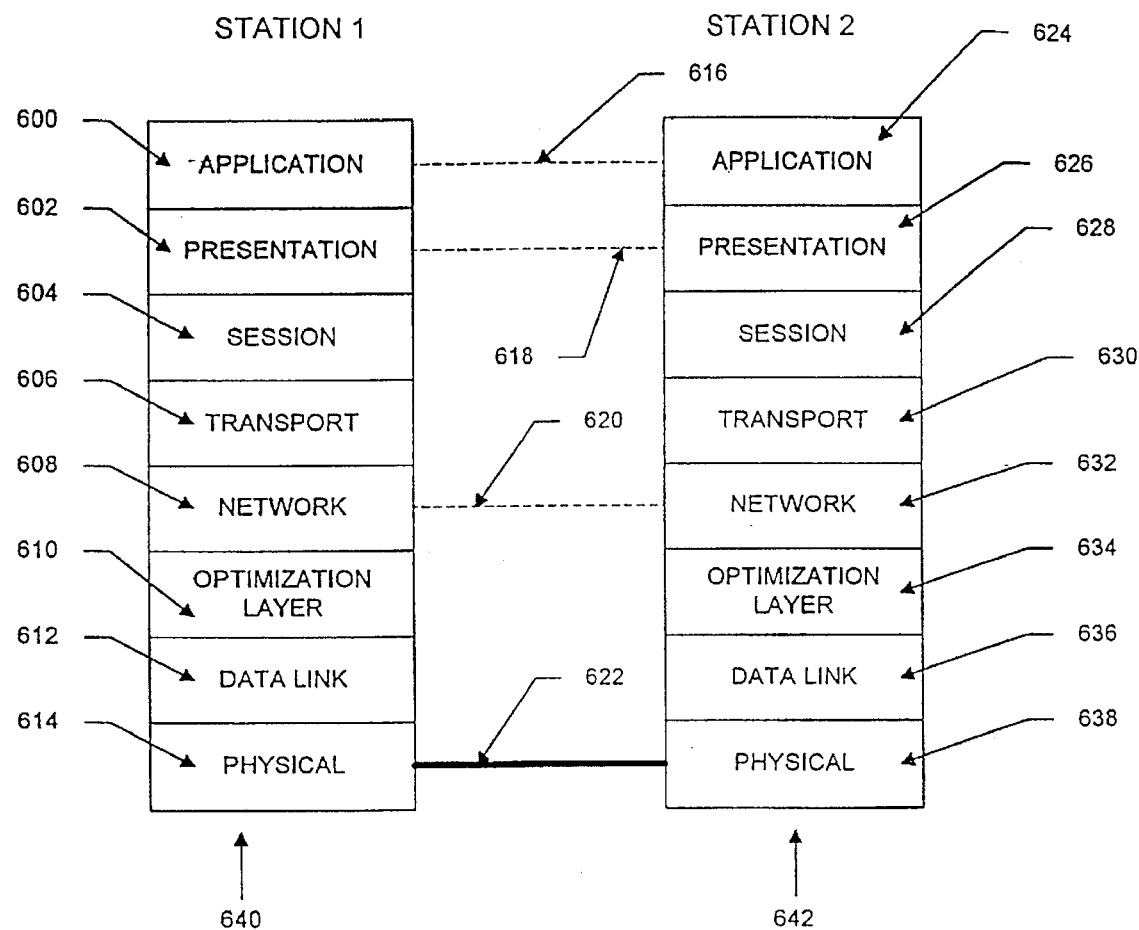
FIG. 6 is a block schematic diagram of protocol stacks used to transmit data between two nodes in which the OSI seven-layer model has been modified in accordance with the present invention to include a optimization layer for optimizing the standard protocols so that they operate efficiently over a wireless WAN.

The exact location of the optimizing layers used in accordance with the present invention is shown by a comparison of FIGS. 5 and 6. FIG. 5 is a diagram of a prior art protocol stack used to connect two nodes in accordance with the OSI standard seven-layer architecture. In accordance with the OSI standard, each protocol stack for a node consists of seven layers. For example, stack 536 for STATION 1 comprises an application layer 500, a presentation layer 502, a session layer 504, a transport layer 506, a network layer 508, a data link layer 510 and a physical layer 512. The operation and the purpose of each of these layers has been previously discussed. Similarly, stack 538 for STATION 2 consists of layers 522–534. Although the actual data communication occurs between the two physical layers 512 and 534 over a data link 520, when the stack is arranged as shown in FIG. 5, each layer can be thought of as communicating with its "peer" which is a layer at the same level as a given layer. For example, the application layers 500 and 522 can be thought of as communicating directly even though information passes through all of the layers 502–512, across data link 520 and back through the layers 534–524. This "peer-to-peer" communication is schematically illustrated by a dotted line 514. Similarly presentation layers 502 and 524 can communicate peer-to-peer as illustrated by dotted line 516 and network layers 508 and 530 can be also be thought of as communicating by shown schematically by dotted line 518.

FIG. 6 discloses an illustrative positioning of the inventive optimization layers in the OSI seven-layer structure. In particular, the optimization layer 610 is inserted into the protocol stack 640 between the network layer 608 and the data link layer 612. Similarly, optimization layer 634 is inserted in stack 642 between network layer 632 and the data link layer 636.

In the OSI seven-layer reference model, the optimization layers 610 and 634 intercept PDUs generated by network layers 608 and 632 which contain nested higher layer PDUs and optimization processing is performed on both the link and higher layer PDUs.

Figure 7:
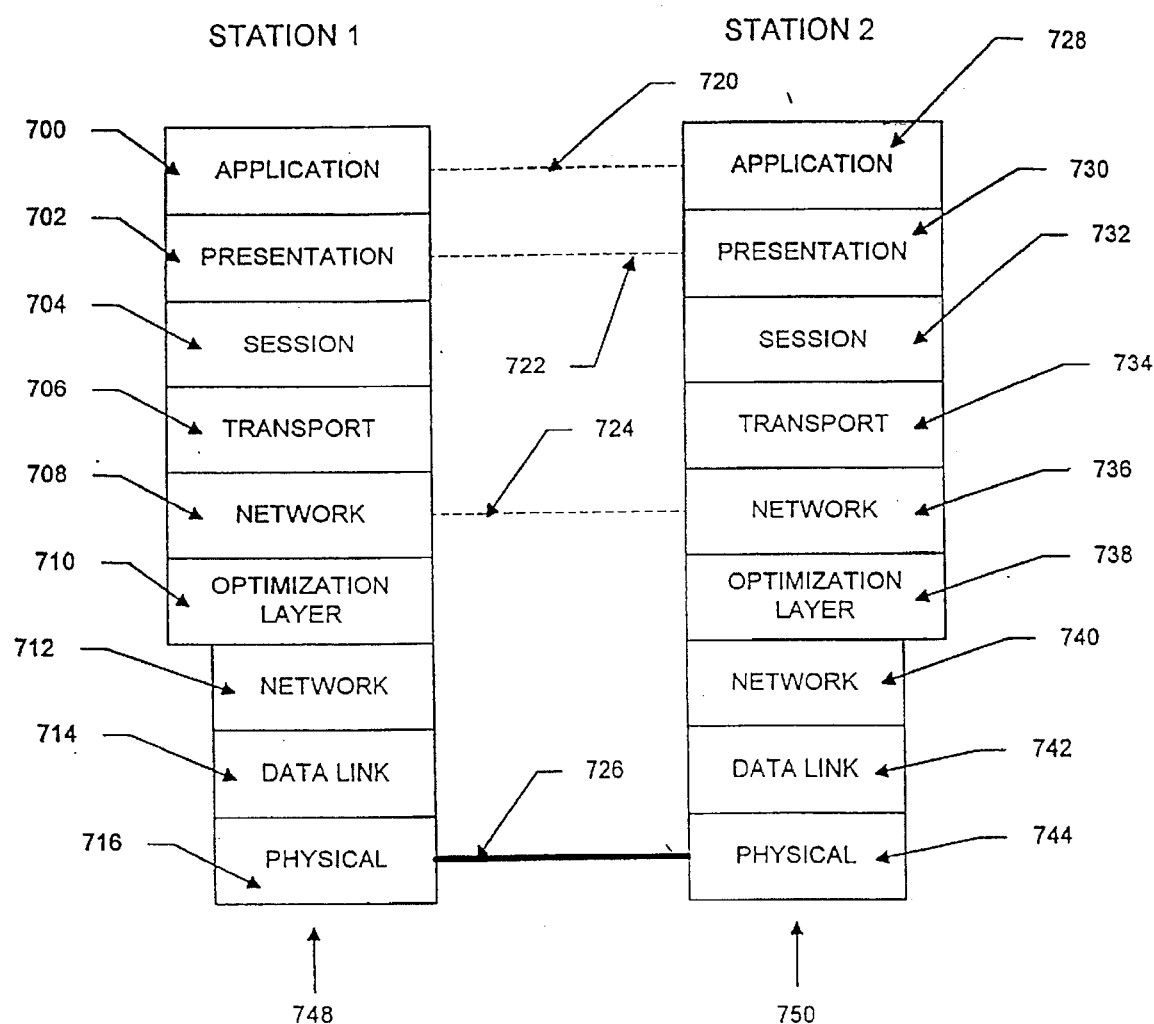
FIG. 7 is a block schematic diagram of protocol stacks modified in accordance with the present invention and used in transmitting information between two nodes in which a subnetwork is used for connectivity.

FIG. 7 shows a common case in which optimized PDUs produced by the optimization layers 710 and 738 are transmitted over a subnetwork using another protocol stack. The initial part of the protocol stack 748 comprises layers 700–708 and is the same as the normal OSI model. Similarly, the initial part of the protocol stack 750 comprises layers 728–736 and is the same as the normal OSI model. In this case, the optimization layers 710 and 738 typically interface to network layers 712 and 740 in the subnetwork. However, it is possible that other layers could also be used.

Although the previous description has concerned generic networks, for simplicity, the following description will assume an interconnection of a LAN and wireless WAN network in accordance with two more specific protocols. However, it will be immediately obvious to those skilled in the art that any existing networks can be used with optimization layers which utilize the principles and operations of the present invention. In the particular embodiments discussed below, the standard "LAN-type" protocol used in this network is called the TP/NP protocol and is used with the OSI layered network architecture. This protocol is typical of such LAN protocols as the NetWare network protocol used on NOVELL networks. The characteristics and operation of this network is well-known and will not be discussed further herein.

The wireless network used in the following description is a generic network similar to many wireless networks presently existing such as the ARDIS, RAM or CDPD networks. The characteristics and operation of these networks are well-known and will not be described further herein in detail.

Figure 8A:
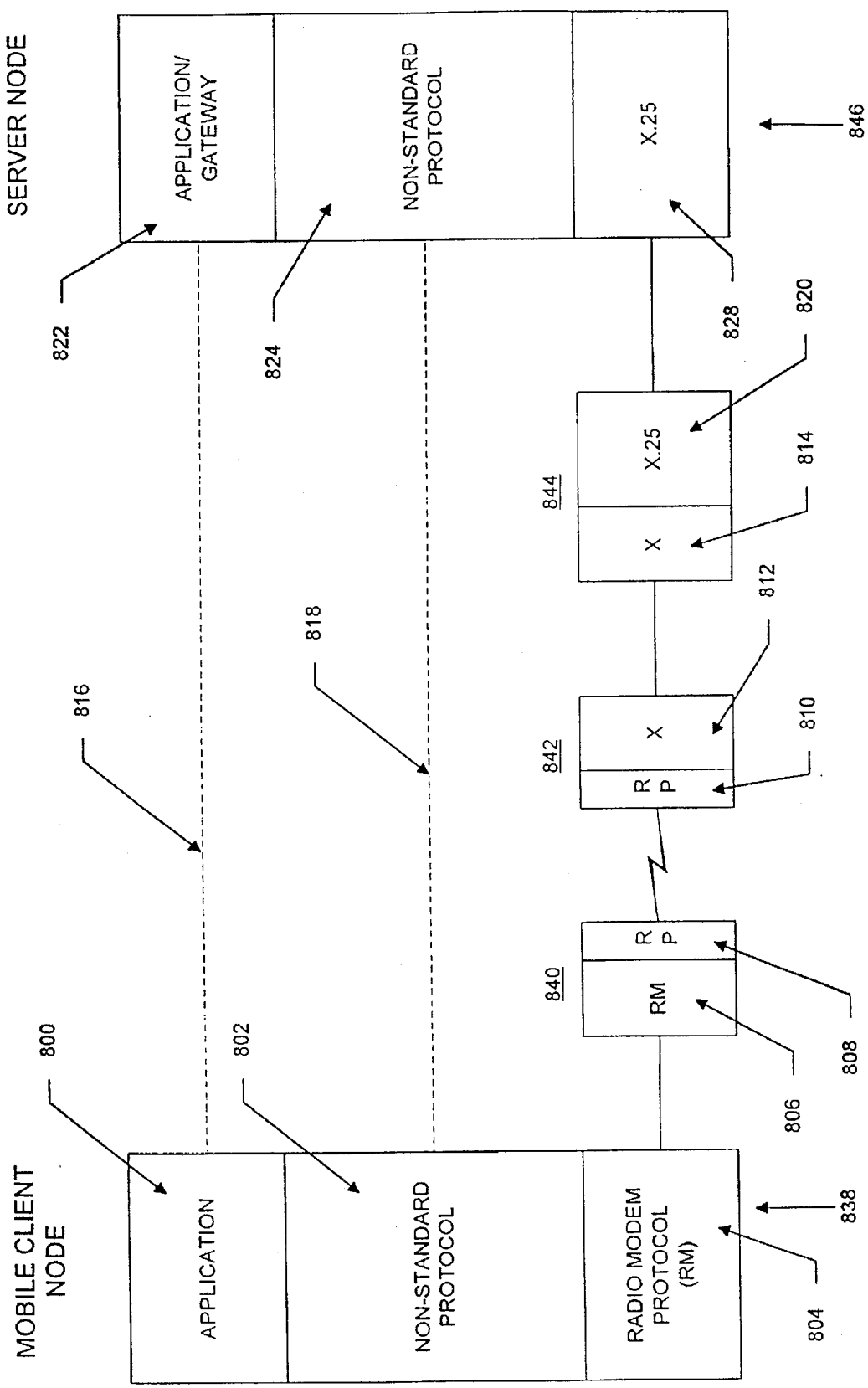
FIG. 8A is a block schematic diagram illustrating prior art protocol stacks which might be used in transmitting between two nodes over a prior art wireless network.

The basic protocol stack diagram for the prior art wireless network is shown in FIG. 8A which illustrates a connection between a mobile client node (stack 838) and a server node on a LAN network (stack 846). The client node protocol stack 838 communicates with a radio packet modem 840 which, in turn, communicates with base station 842. Base station 842 communicates with a message switch 844 which, in turn, communicates to the LAN server stack 846. Application program 800 can thought of as communicating with its peer program application/gateway program 822 shown schematically by dotted line 816. Similarly, the non-standard protocol layer 802 can be thought of as interfacing directly with the non-standard protocol layer 824 via dotted line 818.

Protocol stack 838 in the mobile client node consists of the application layer 800, non-standard protocol layer 802, and a protocol layer 804 for the protocol used by the radio packet modem 840. The non-standard layer 802 is network specific and must be used by clients and hosts/gateways which access the wireless network. Protocol layer 802 provides the means whereby the mobile client node identifies the host to which it wants to communicate and other options, such as the use of acknowledgements.

The modem protocol layer 804 converts the non-standard protocol used in layer 802 to the radio modem protocol (RM) used to interface with the radio packet modem 840. This latter protocol is both network and modem specific.

The radio packet modem, in turn, communicates with the base station 842 by means of a radio protocol (RP). The modem/base station radio protocols generally include significant error correction overhead and, if retries and acknowledgements are taken into account, the effective throughput over the radio link is typically only 10% to 50% of the nominal throughput depending on the traffic being carried over the network.

The information is transferred over the radio link in the radio protocol and is received at the base station 842. At base station 842, yet another transformation is conventionally made to convert the information in the radio protocol 812 into an internal format 812 denoted as "X" in FIG. 8A. The information is then forwarded to the network message switch 844.

In switch 844, the information is converted from the internal "X" format 814 to a standard data link protocol 820, which may be, for example, the conventional X.25 format. The information, now in X.25 format, is typically forwarded to the server node stack 846 over a land link.

In the server protocol stack, the X.25 information is processed by X.25 protocol layer 828, but the server must also implement the network-specific non-standard layer 824. The non-standard protocol layer 824 provides the means for a host to identify the client with which it wants to communicate and to multiplex traffic for multiple modems over one X.25 communication link. A typical wireless network operates in the "datagram" mode where positive end-to-end acknowledgements of data packets are not available. Consequently, the basic class of service offered by most wireless networks is all unreliable datagram service— messages may be lost, duplicated or delivered out of sequence.

Figure 8B:
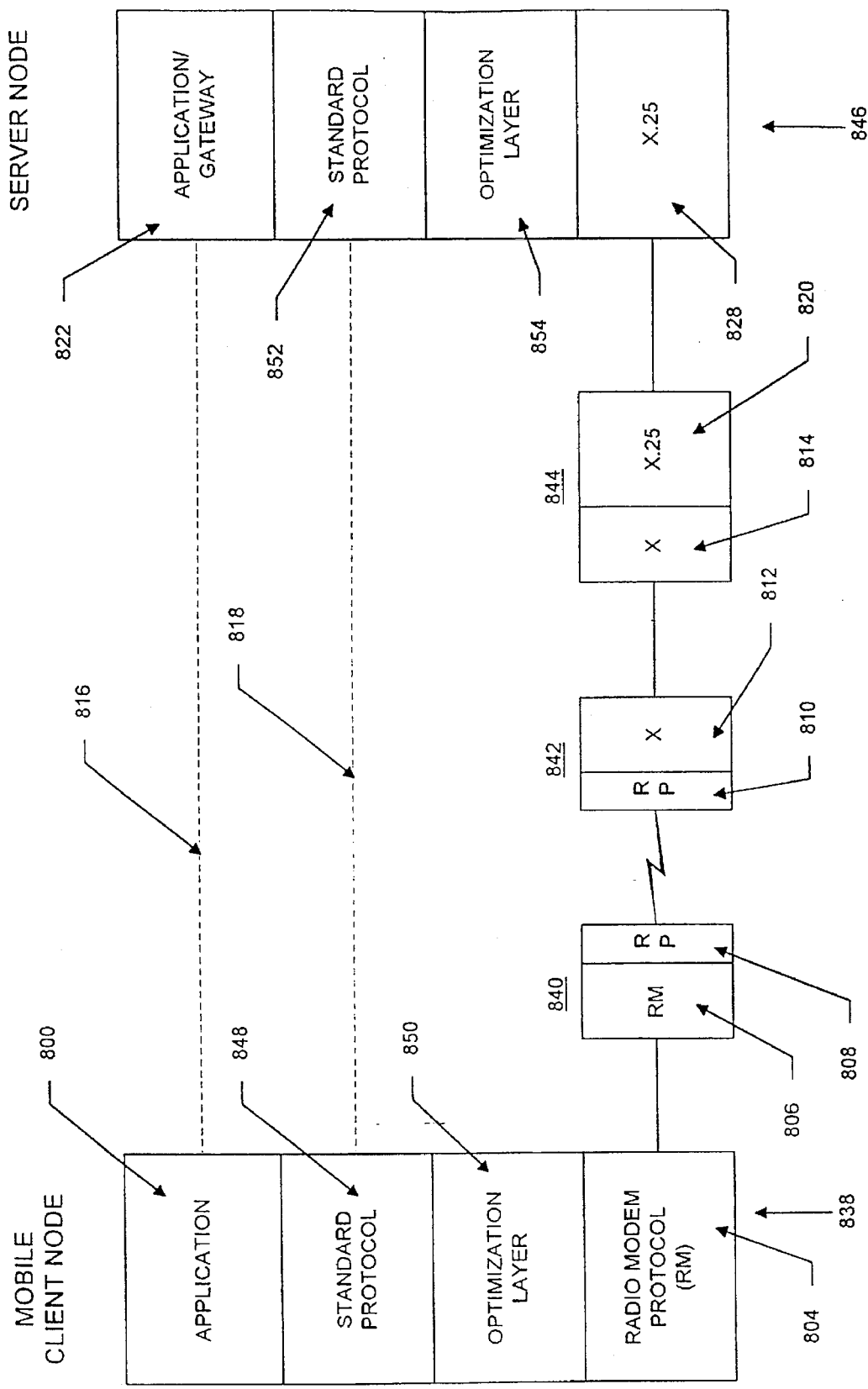
FIG. 8B is a block schematic diagram illustrating protocol stacks used in transmitting between two nodes over the prior art wireless network and modified in accordance with the principles of the present invention.

FIG. 8B shows the wireless network protocol stack diagram modified in accordance with the present invention. Ill FIG. 8B elements common to FIG. 8A are denoted by the same numeral designations and a comparison of FIG. 8A and FIG. 8B indicates that non-standard protocol layer 802 of the client node protocol stack have been replaced by a standard protocol layer 848 and the inventive optimization layer 850. On the server protocol stack, the non-standard protocol layer 824 has been replaced by a standard protocol layer 852 and the optimization layer 854. The optimization layer 850 appears as a LAN driver to the standard protocol layer 848 and as a standard protocol stack to the modem protocol layer 804. Thus, its operation is transparent to the client protocol stack 838 and a standard protocols layer 848 can be used. Similarly, the optimization layer 854 appears as an X.25 driver to the standard protocol layer 852 on the server side and as a standard protocol stack to the X.25 driver 828. It therefore operates transparently to the server protocol stack 846.

Figure 9:
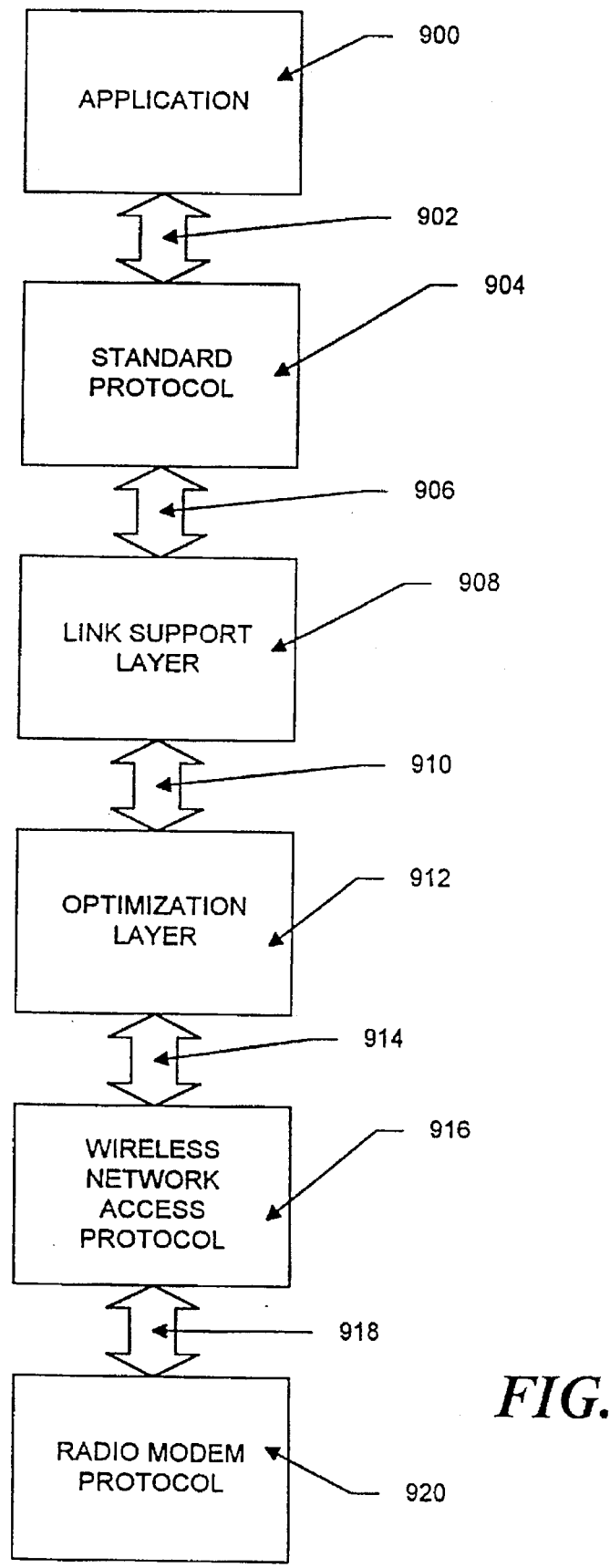
FIG. 9 is a block schematic diagram illustrating the basic structure and arrangement of software programs included in a client node which processes data and performs data compression and optimization in accordance with the present invention.

The specific structure and arrangement of the software used in both the client node and the server node will now be discussed in more detail. Specifically, FIG. 9 illustrates the components of the software used in the client node stack 838 as modified by the invention. The application component 900 is the standard application layer which uses the standard protocol interface for communication with a peer application or a gateway of some sort. The application layer 900 interface is indicated schematically by double arrow 902 and application layer 900 communicates with the standard protocol stack 904. Protocol stack 904 communicates with a peer standard protocol stack using standard protocols such as IPX/SPX or TCP/IP. In accordance with the invention, the application layer need not concern itself further with the wireless network protocol.

Standard protocol layer 904, in turn, communicates (as shown schematically by double arrow 906) with a link support layer 908. The link support layer 908 comprises software which allows data packets to be routed between a protocol stack and a network driver. More specifically, link support layer 908 contains two device interfaces consisting of the protocol stack/link support layer interface illustrated by arrow 906 and the link support layer/LAN driver interface indicated by arrow 910.

In a prior art software stack, stack 904 would be a wireless network access protocol stack. However, in accordance with the present invention, an additional optimization layer 912 is inserted between the link support layer 908 and file wireless network access protocol layer 916. The optimization layer 912, in turn interfaces with the wireless network access protocol layer 916 as indicated by the double arrow 914. The wireless network access protocol layer 916 interfaces (illustrated by arrow 918) with a radio modem protocol layer 920. The wireless network access protocol layer 916 and the radio modem protocol layer 920 handles the protocol used in the wireless network and the modem protocol used in the client/modem interface (the "radio modem protocol" illustrated in FIG. 8A).

The optimization layer 912 conforms to the link support layer/driver interface indicated by arrow 910 and appears to the link support layer 908 and the layers above it as just another LAN driver. The optimization layer also conforms to the driver protocol stack interface indicated by arrow 914 and appears as simply another protocol stack. The optimization layer 912 includes a data compressor routine and a data decompresssor routine as discussed in detail below. The optimization layer 912 is network specific as it utilizes whatever error and status information the network provides to carry out the optimization, but the interfaces of this layer with the link support layer 908 and the wireless network access protocol layer 916 are fixed.

Figure 10:
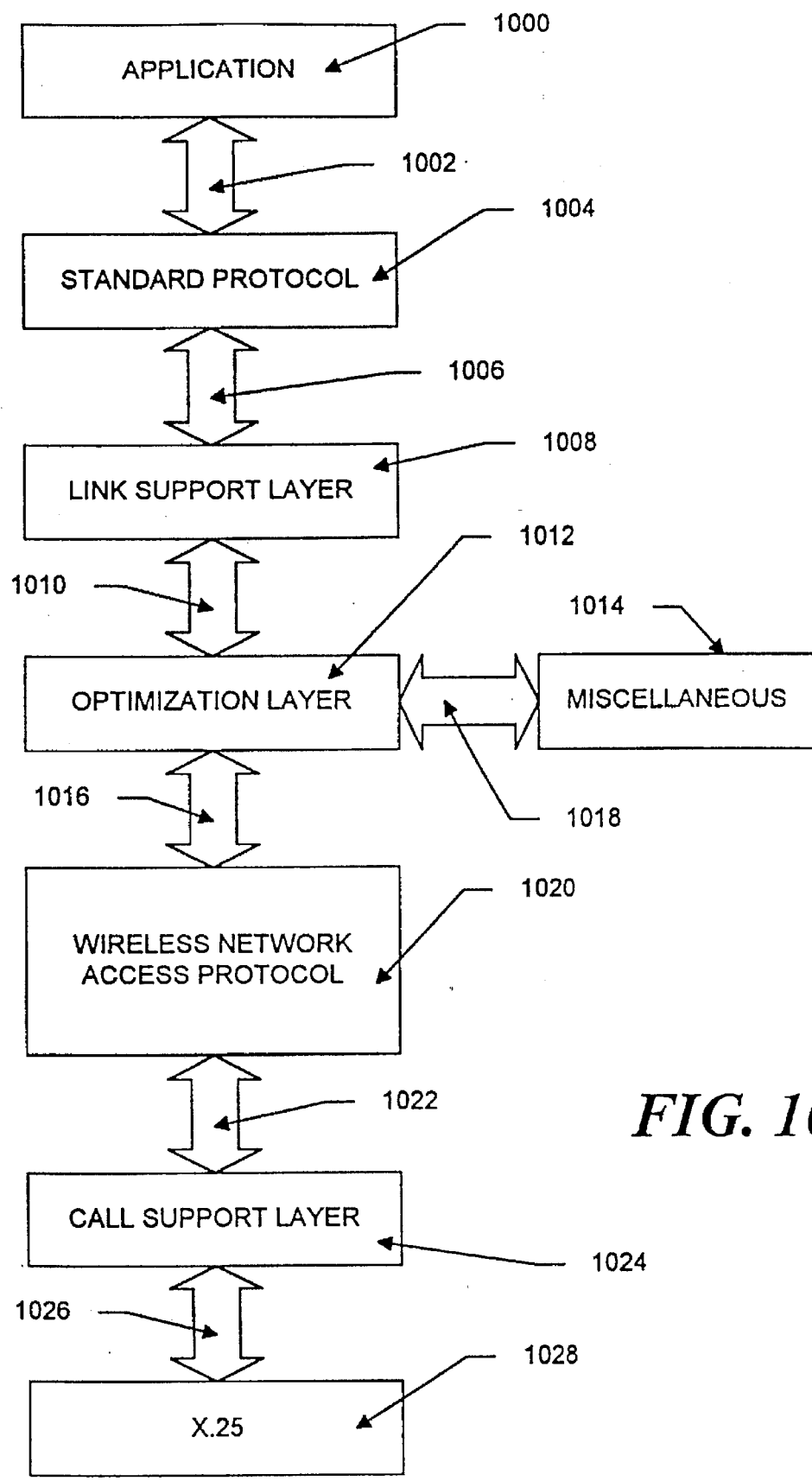
FIG. 10 is a block schematic diagram illustrating the software structure and arrangement in an illustrative server node incorporating the data compression and optimization of the present invention.

FIG. 10 illustrates the structure and arrangement of the inventive software used in the server node stack 846 as modified by the invention. In particular, application layer 1000 is the usual application layer that uses the standard LAN protocols to communicate with an application running on the server device. Application layer 1000 may be the client's peer application or it may perform the functions of a gateway to another system.

Application layer 1000 interfaces (as indicated by arrow 1002) with the standard protocol layer 1004 which is the TP/NP protocol stack previously described. The standard protocol stack 1004, in turn, interfaces, as indicated by arrow 1006, with the link support layer 1008 and the link support layer 1008 communicates with the optimization layer 1012, as indicated by arrow 1010. The link support layer 1008 performs similar functions to the link support layer (908, FIG. 9) discussed in connection with the client node software.

The optimization layer 1012, in turn, interfaces with a wireless network access protocol layer 1020 as indicated by arrow 1016. The optimization module emulates a LAN network driver, appearing to the link support layer 1008 as just another LAN driver. It also acts as a "protocol stack" appearing to the wireless network access protocol layer 1020 as just another protocol stack.

The wireless network access protocol layer 1020 handles the wireless network access protocol and is network specific (therefore, some networks may not require such a module as the server/network interface may use standard protocols such as TCP/IP or X.25). The wireless network access protocol layer 1020 cooperates with call support layer 1024 as shown by arrow 1022. Call support layer 1024 provides an interface to the X.25 communication link 1028. Alternatively, other protocols such as TCP/IP could be used.

The optimization layer 1012 is network specific and, as with the client node software, the optimization layer 1012 performs data compression and decompression utilizing a "protocol" which is the compressed form of a data packet. The data compression and decompression is also network specific as it utilizes the error and status information with the network provides to carry out the optimization. The optimization layer 1012 operates with a miscellaneous module 1014 which is a collection of modules which implement such features as security, accounting, tracing and other local administrative and operational functions—some of these functions, for example accounting, are network specific.

The optimization layers 912 and 1012 perform several different types of optimization functions on the standard protocols to render them suitable for transmission over the wireless network. The effect of the inventive reduction is to treat the wireless network, including the network switch and the mobile client nodes, as simply another network segment, in this case connected to a server node. However, since all radio traffic must pass through the network switch, all mobile clients will have a common address component which identifies the network "segment". This common component is termed the network address.

Figure 11:
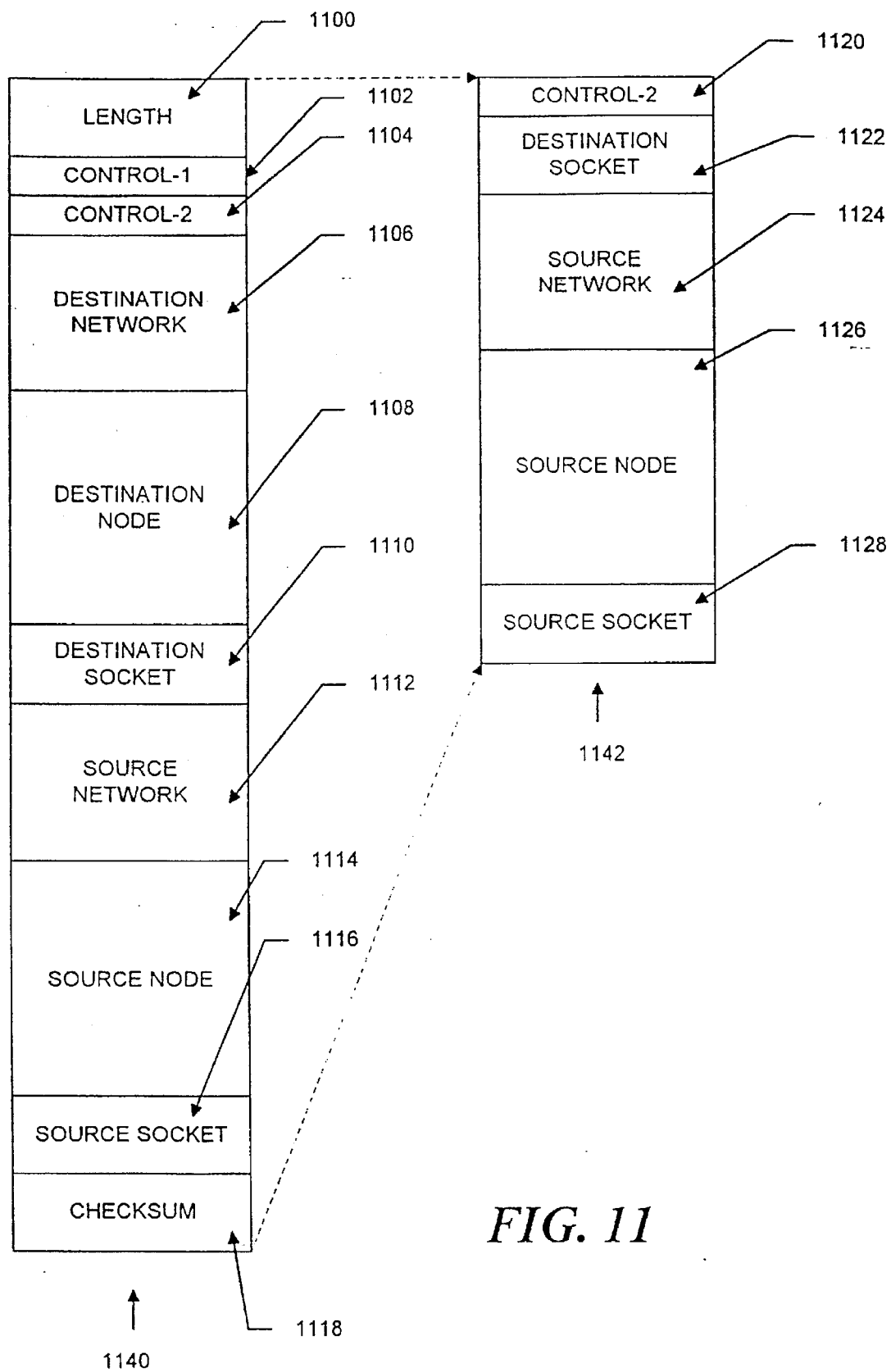
FIG. 11 is a schematic diagram illustrating a standard protocol header for a data packet to be transmitted from a server node over a wireless WAN showing the header both in original form and in reduced form after optimization in accordance with the present invention.

An example of optimization which can be performed on typical LAN NP protocols is shown in FIG. 11 which illustrates protocol header field reduction. FIG. 11 schematically shows a LAN NP packet 1140 before header field reduction and an NP packet 1142 after header field reduction. Although selected fields are shown in a particular order in FIG. 11, the field types and order can vary from protocol to protocol, but the inventive header field reduction method can still be used. The standard NP packet header portion 1140 comprises a length specification 1100, a first control specification 1102 and a second control specification 1104. Also included are a destination network address 1106, a destination node address 1108, a destination socket address 1110, a source network address 1112, a source node address 1114, a source socket address 1116 and a checksum 1118.

For transmission between a wireless WAN and a LAN, the first control field 1102 and the checksum 1118 are not used and are redundant. Accordingly, these fields can be removed from the reduced NP header field by the data compression routines in the optimization layers 912 and 1012 as shown in the reduced header field 1142. In addition, the length of a particular data packet may be deduced from the length of a lower layer PDU and does not need to be carried explicitly in the NP packet, thus the length field 1100 can be eliminated in the reduced header form 1142. Also, when sending information to a mobile client node, an explicit destination network address 1106 is not necessary as this address is a fixed value corresponding to the wireless network server and the base unit address; therefore this information can be removed. Finally, the destination node address information 1108 is replicated in the lower layer protocol and can be removed.

The resulting reduced field 1142 contains a second control field 1120 (corresponding to the second control field 1104 in the unreduced header 1140). A destination socket address 1122 is also retained from the destination socket address 1110, and the source network address, the source node address and the source socket addresses 1124, 1126 and 1128, respectively, are carried over from the source network address 1112, the source node address 1114 and the source socket address 1116. Other conventional reductions may also be accomplished, for example, leading zeros may be removed from address fields that are sent with a count of the number of zeros removed kept in a bitmap field, but these conventional reductions are not shown in FIG. 11 for clarity.

In accordance with the invention, the illustrative optimization layer uses the reduced NP header to "construct", for example, the wireless network protocol data units (PDUs) used in the specific wireless WAN. In the case of a transmission from a server node on a LAN network to a mobile client located on the wireless network, a wireless PDU must be constructed from the NP header and data used in the LAN data packet because the wireless network expects such a data packet and the optimization layer must operate transparently to both the LAN network and the wireless network. The wireless PDU is constructed using the reduced NP header 1142 in file manner shown in FIG. 12A.

More specifically, a conventional wireless PDU comprises a header part 1200 and a data part (indicated schematically by heavy line box 1202) and the optimization layer 1012 (FIG. 10) contains a data constructor routine which "constructs" a wireless message by treating the reduced NP header and the original NP data as wireless packet "data" and appending this "data" to the conventional wireless header. The conventional wireless header comprises various type codes, format codes, acknowledgement indicators, header bytes and control bytes. These values are set by the optimization layer to appropriate values. In addition, most wireless headers also contain a subscriber unit address which is set to the destination node address found in the standard NP header (1108 in FIG. 11).

The wireless header 1200 is followed by wireless PDU data 1202 which, in accordance with the invention, comprises the NP information. In particular, the optimization layer inserts into the wireless data part a Compression ID field 1204 which indicates which type of data compression has been applied to the NP data (if any). The Compression ID field 1204 is, in turn, followed by the reduced NP header 1206 (corresponding to header 1142 in FIG. 11). Finally, the reduced NP header 1206 is followed by the data 1208 which was part of the original NP packet.

Figures 12A, 12B:
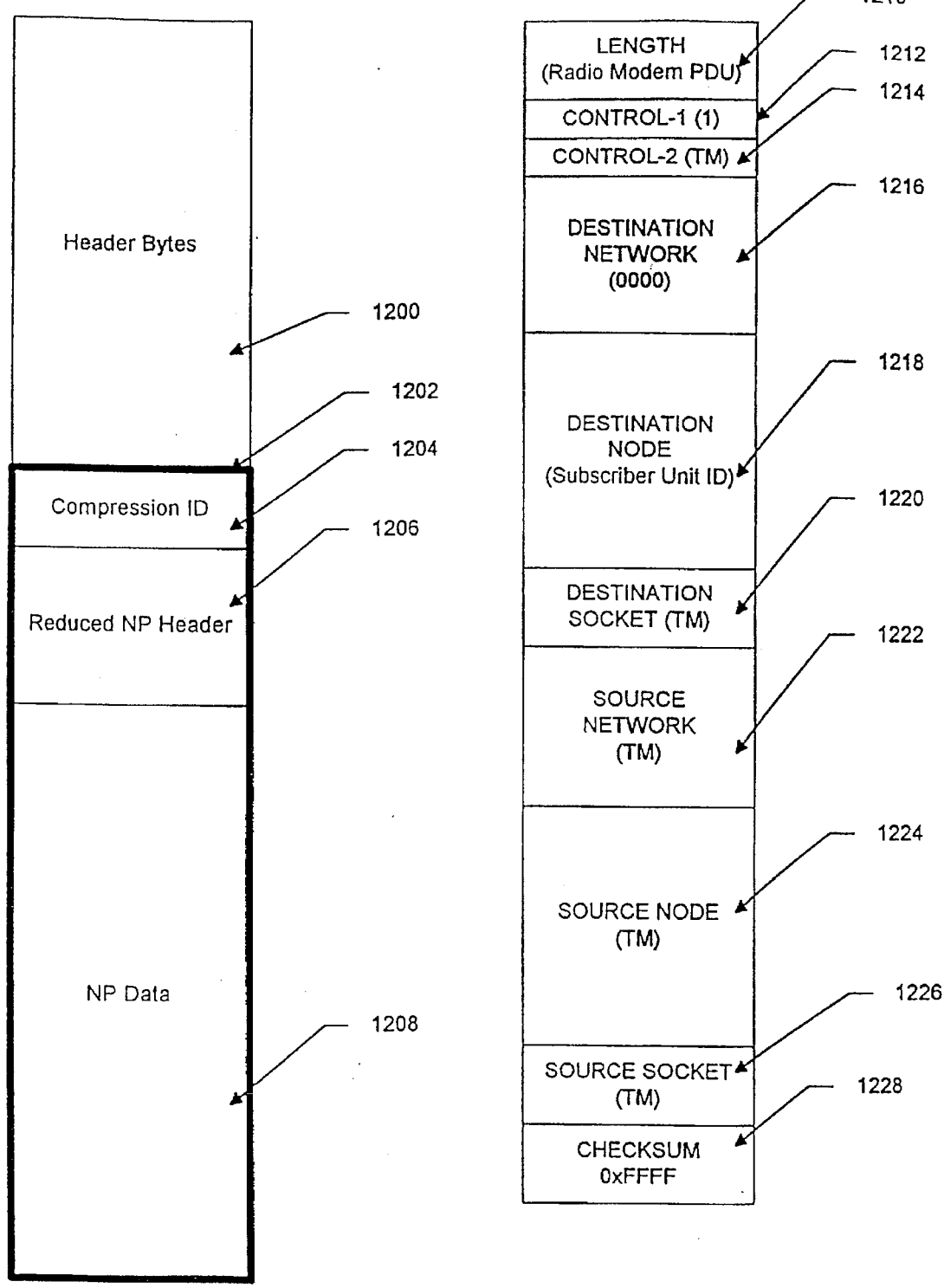
FIG. 12A schematically illustrates the construction of a data packet arranged in a wireless network protocol for transmission from the server node over an illustrative wireless network which data packet incorporates the reduced header shown in FIG. 11 in the "data" portion of the packet.
FIG. 12B schematically illustrates the reconstruction of the standard protocol header for the data packet shown in FIG. 12A after the packet has been received at the client node.

The constructed wireless PDU is transmitted through the server node over the wireless WAN network to the mobile client node. When the PDU is received at the mobile client node, as previously mentioned, it is in the radio modem protocol used by the radio packet modem. This radio modem PDU contains a header part, the contents of which is dependent on the radio modem used, and a data part which is equivalent to the data part of the constructed wireless PDU and, thus, contains the original NP data and the reduced NP header, previously described. Consequently, in accordance with the invention, it is necessary to reconstruct a standard NP PDU so that applications running on the mobile client node can use the standard NP protocol. The standard NP header is reconstructed from the incoming radio modem PDU as shown in FIG. 12B by the optimization layer 912 (FIG. 9).

In particular, NP fields which are unused or always have the same value are assigned predetermined values as these fields will not be included in the reduced NP header. For example, the NP checksum 1228 is assigned an predetermined value, for example, 0xFFFF (assigned values are shown in parentheses in the fields). The NP length field 1210 is set to a length derived from the incoming radio modem PDU; the first control field 1212 is set to an appropriate valid value, for example "1". The second control field 1214 is set to the value of the second control field in the radio modem PDU "data" which includes the reduced NP header forwarded from the server node. As previously mentioned, the second control field is retained from the original NP header. The destination network field 1216 is set to all zeros and the destination node field 1218 is set to the subscriber unit ID contained in the original wireless headed and now found in the radio modem header. The remainder of the fields including the destination socket field 1220, the source network field 1222, the source node field 1224 and the source socket field 1226 are set to values in the transmitted message (TM) which are contained in the reduced NP header located in the radio modem packet "data" part. The remainder of the radio modem "data" part becomes the NP data part.

Figure 13:
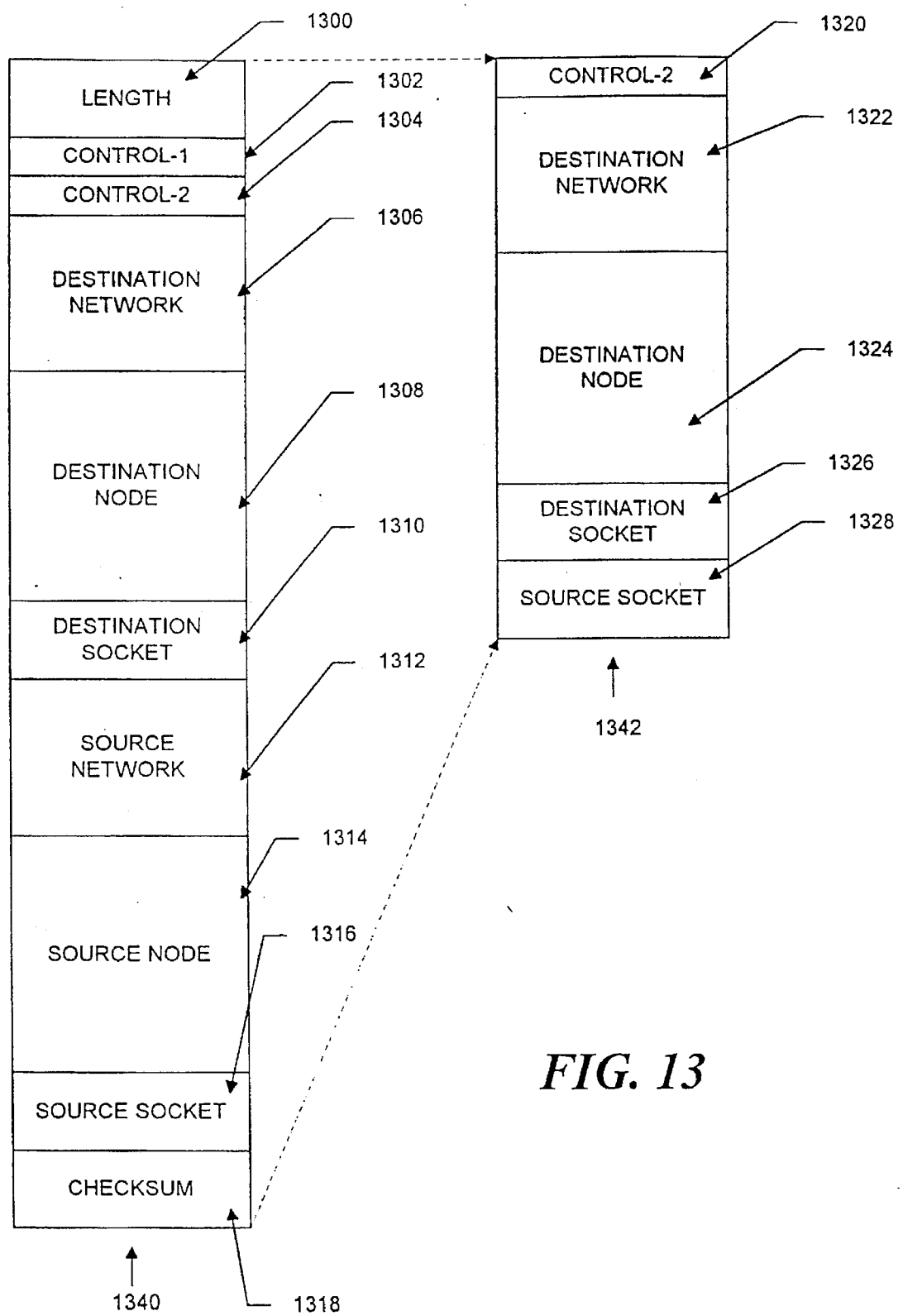
FIG. 13 is a schematic diagram illustrating a standard protocol header for a data packet to be transmitted from a client node over a wireless WAN showing the header both in original form and in reduced form after optimization in accordance with the present invention.

A similar reduction in the NP header is carried out during transmissions from the mobile client node to the server node on the LAN. In particular, this reduction is shown in FIG. 13 which schematically shows an NP packet 1340 before header field reduction and an NP packet 1342 after header field reduction. As previously mentioned, the standard NP packet header 1340 comprises a length specification 1300, a first control field 1302 and a second control field 1304. Also included are a destination network address 1306, a destination node address 1308, a destination socket address 1310, a source network address 1312, a source node address 1314, a source socket address 1316 and a checksum 1318.

For transmission between a wireless WAN and a LAN, the checksum 13 18 and the first control field 1302 are redundant and can be removed from the reduced header field 1342. The length specification 1300 of a particular data packet will later be set to the length of a lower layer PDU and can also be removed. When sending information to the LAN, an explicit destination network address 1306 is necessary, and therefore, the destination network, node and socket fields, 1306, 1308 and 1310 are retained. However the source address information can be set at the WAN server and thus the source network information, including the source network field 1312 and the source node field 1314 is omitted.

The resulting reduced field 1342 contains a second control field 1320 (corresponding to the second control field 1304 in the unreduced header 1340). Destination network, node and socket addresses, 1322, 1324 and 1326, respectively, are also retained from the corresponding fields 1306, 1308 and 1310, and the source socket address 1328 is carried over from the source socket address 1316.

Figure 14A:
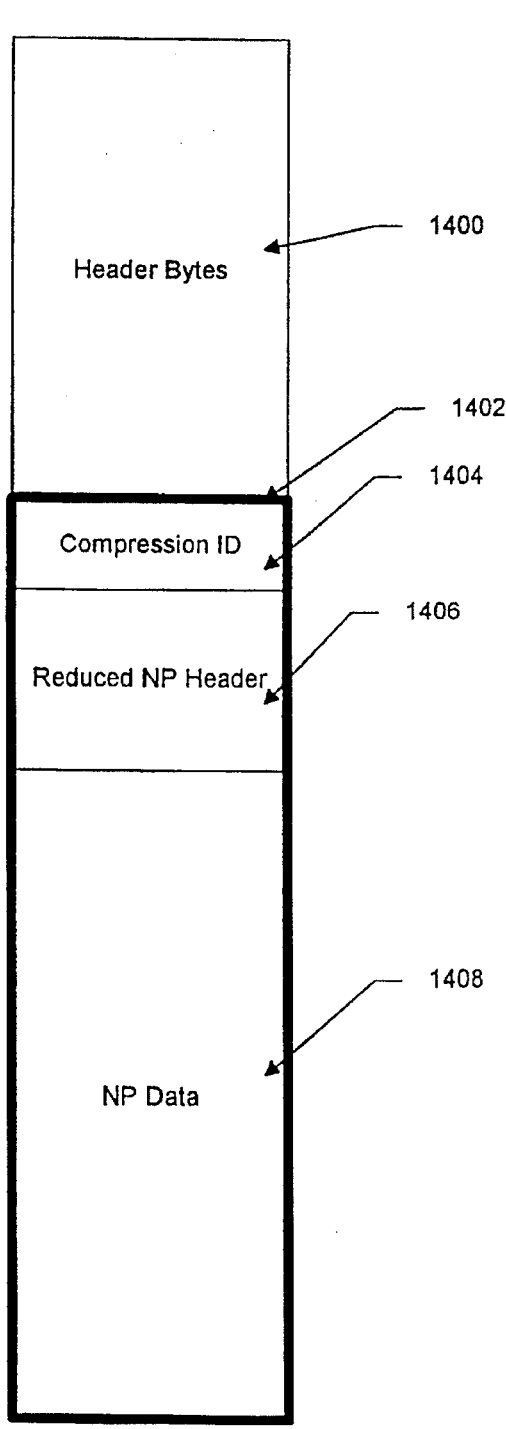
FIG. 14A schematically illustrates the construction of a data packet arranged in wireless network protocol for transmission from the client node over an illustrative wireless network which data packet incorporates the reduced header shown in FIG. 13 in the "data" portion of the packet.

In accordance with the invention, the illustrative optimization layer uses the reduced NP header 1342 to "construct" the radio modem PDU used by the radio packet modem in the wireless WAN. The radio modem PDU is constructed using the reduced NP header 1342 in the manner shown in FIG. 14A. More specifically, a conventional radio modem PDU comprises a header part 1400 and a data part 1402 and the optimization layer 912 (FIG. 9) "constructs" a radio modem message by treating the reduced NP header and the NP data as radio modem "data". The conventional radio modem PDU header comprises various control fields, length fields and header bytes. The radio modem length field (not shown in FIG. 14) is set by the optimization layer 912 to a length based on the NP PDU length. The remaining fields are set to appropriate predetermined, fixed values.

The radio modem header 1400 is followed by radio modem data (schematically illustrated by heavy line box 1402) which, in accordance with the invention, comprises the NP information. In particular, the optimization layer inserts into the radio modem data part, a Compression ID field 1404 which indicates which type of data compression has been applied to the NP data (if any). The Compression ID field 1404 is followed by the reduced NP header 1406 (shown in detail as 1342 in FIG. 13). Finally, the reduced NP header 1406 is followed by the NP data 1408.

Figure 14B:
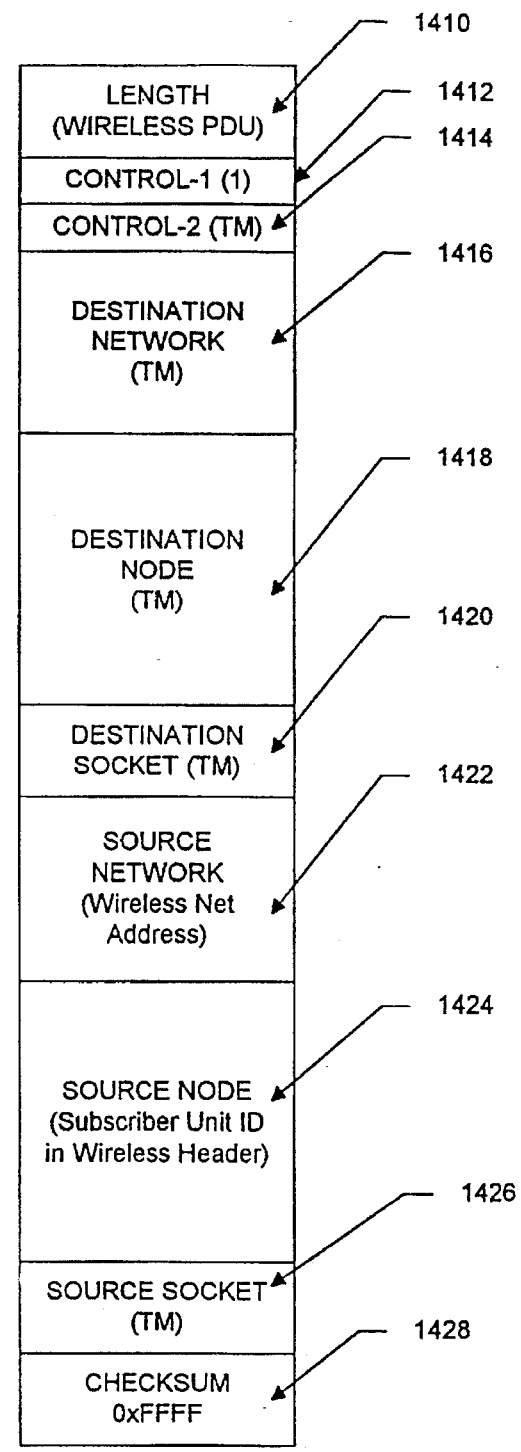
FIG. 14B schematically illustrates the reconstruction of the standard protocol header for the data packet shown in FIG. 14A after the packet has been received at the server node.

The constructed radio modem PDU is transmitted through the radio packet modem over the wireless WAN network where it appears as a wireless PDU to the LAN server node. When the wireless PDU is received at the LAN server node, it is necessary to reconstruct a standard NP PDU so that applications running on the server can use the standard NP protocol. The standard NP header is reconstructed from the incoming wireless PDU as shown in FIG. 14B.

In particular, NP fields which do not have corresponding values found in the wireless protocol fields are assigned predetermined values. For example, the NP checksum 1428 is assigned a value of 0xFFFF. The NP length field 1410 is set to a length derived from the incoming wireless PDU; the first control field 1412 is set to "1". The second control field 1414 is set to the value of the second control field in the wireless PDU "data" which includes the reduced NP header forwarded from the WAN. As previously mentioned, the second control field is retained from the original NP header. The destination network, node and socket fields, 1416, 1418 and 1420, are also set to the values retained from the original NP header forwarded via the wireless PDU "data". The source network address is set to the address of the wireless network on the LAN server. The source node field 1424 is set to the subscriber unit ID obtained from the wireless header and the source socket field 1426 is set to the value in the transmitted message (TM) which are contained in the reduced NP header located in the wireless PDU "data". The remainder of the wireless PDU "data" becomes the NP data.

Figure 15:
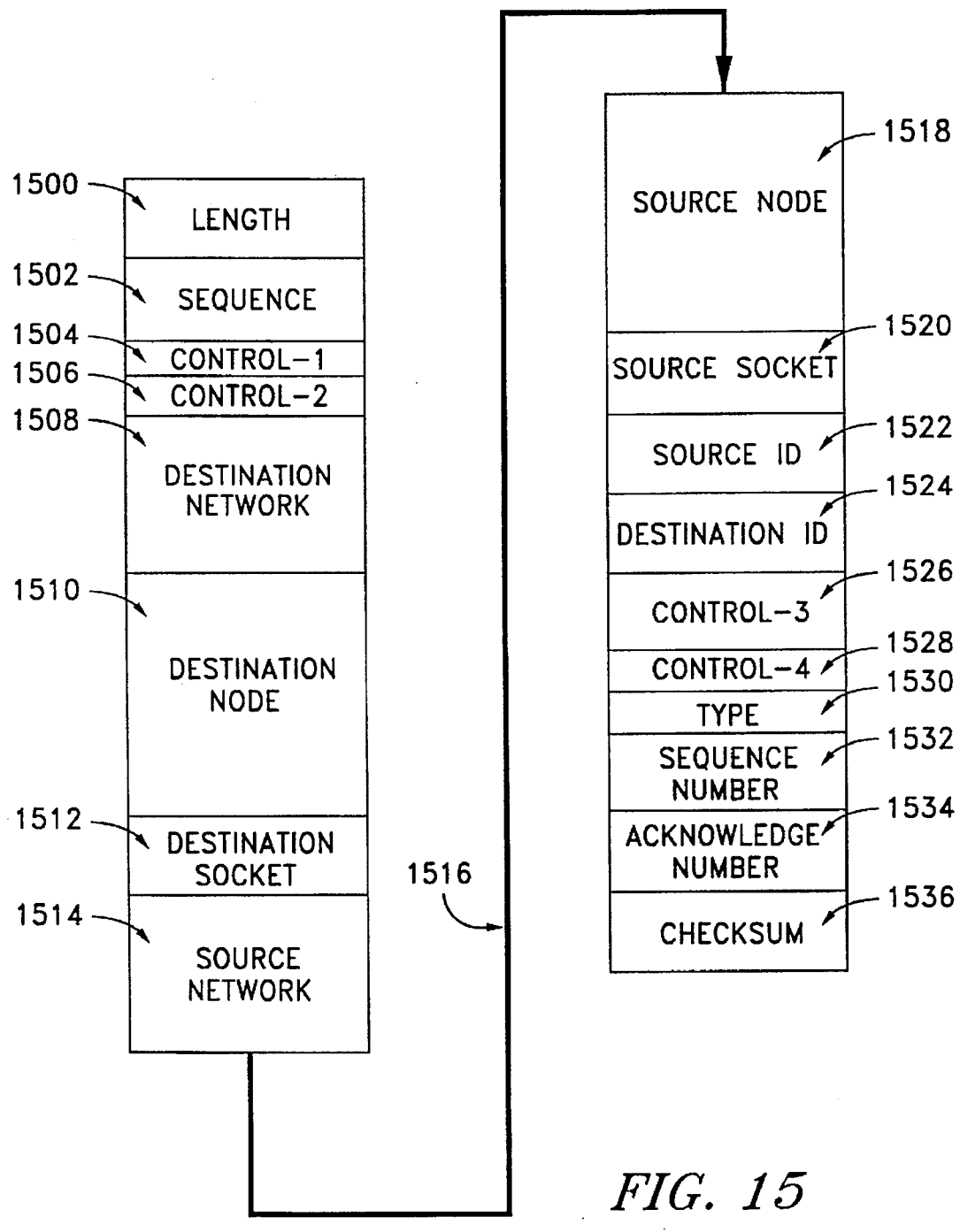
FIG. 15 illustrates another data packet header illustrating how certain header fields can be replaced by tokens in accordance with the present invention.

Another type of header field reduction can be carried out on the TP protocol header which reduction is shown schematically in FIG. 15 which illustrates one header part (schematically shown in two parts connected by an arrow 1516 to fit the header on the page). In particular, the aforementioned TP protocol is a connection-oriented protocol and, after a connection has been established, data is transferred and the connection is terminated. However, for the duration of the connection, the source and destination NP addresses and the source and destination connection identifiers are fixed. Consequently, in accordance with the invention, these fields are not sent in the reduced TP data packets or acknowledgements, but are instead replaced by "tokens" which consist of a fixed number of information-bytes. Referring to FIG. 15, a typical unreduced TP header protocol consists of various control fields, including a length specification 1500, a sequence control field 1502, various other control fields 1504, 1506, 1526 and 1528. Also included are various type fields, sequencing and acknowledgement fields and a checksum field 1530, 1532, 1534 and 1536, respectively. Destination and source addresses are also present including a destination network address 1508, a destination node address 1510, a destination socket address 1512, a source network address 1514, a source node address 1518, a source socket address 1520 and two ID addresses, 1522 and 1524.

After a connection is established, the data compression and optimization module 1012 (FIG. 10) removes the shaded source and destination addresses and identifiers including the destination network address 1508, the destination node address 1510, the destination socket address 1512, the source network address 1514, the source node address 1518, the source socket address 1520, the source ID 1526 and the destination ID 1528. In place of these fields, a short token field is sent to identify the connection, these token fields can be any unique field and a table is maintained of the token fields and the corresponding actual addresses in both the source and destination nodes during the communication session. Accordingly, the appropriate optimization module replaces the fields with the corresponding token field before transmission and replaces the token field with the corresponding address fields on reception.

In addition, in accordance with other aspects of the invention, the data optimization may also provide additional filtering and compression functions in order to further optimize data transmission, for example, packet filtering can be done on the packet data stream to prevent overload of the wireless WAN due to repeated retransmission requests.

Figure 16:
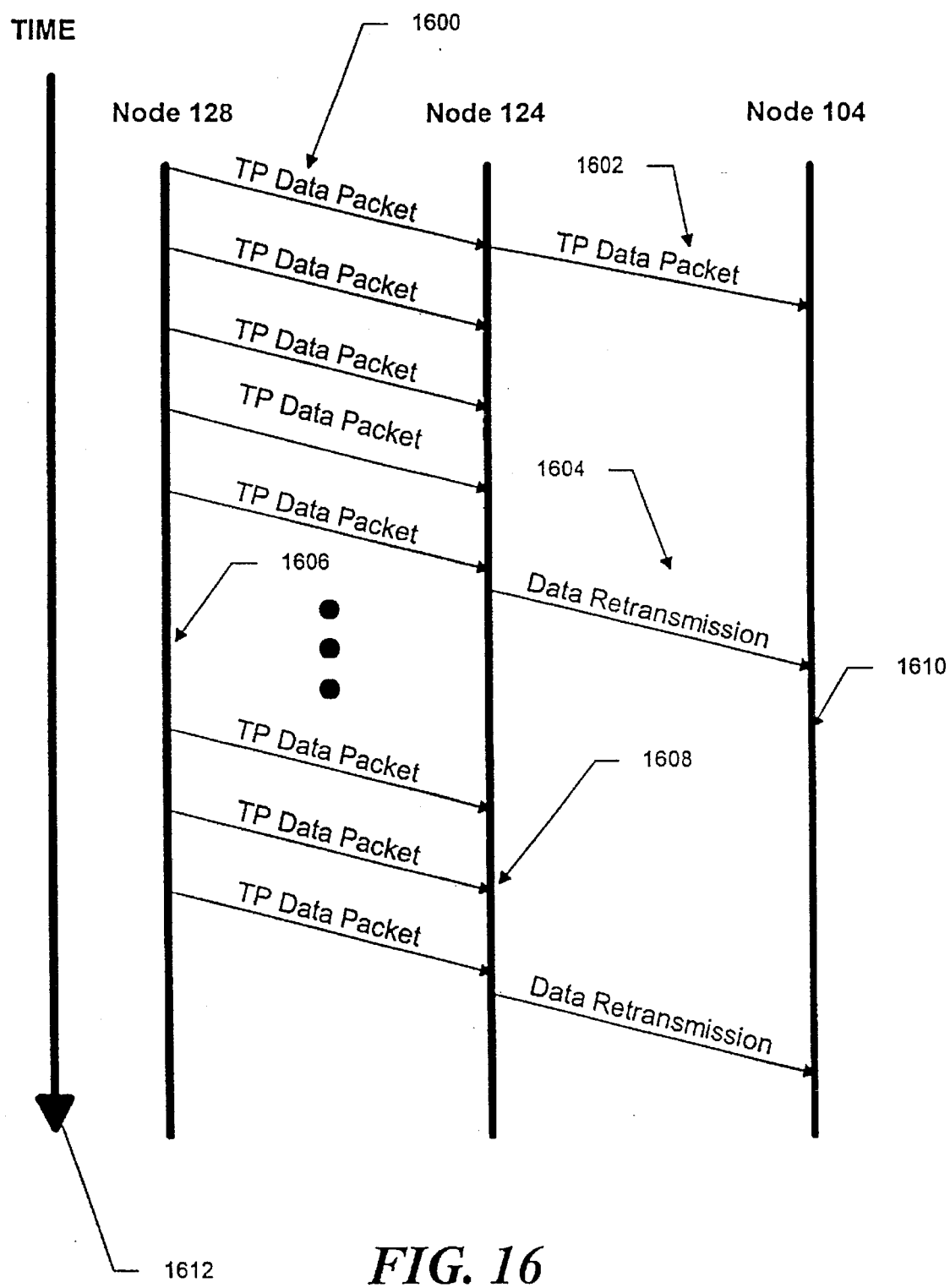
FIG. 16 is a schematic illustration of retransmission request filtering performed in accordance with one aspect of the present invention.

This filtering is illustrated in FIG. 16 which shows a data packet transmission between a node on an enterprise network (illustratively node 128 in FIG. 1) and a node on the wireless network (illustratively, node 104 in FIG. 1). As shown in FIG. 1, such a transmission passes through server node 124. FIG. 16 shows the data packets passing between the nodes over time which increases in the direction of arrow 1612. Each node is represented by a vertical line node 128 corresponds to line 1606; node 124 corresponds to line 1608 and node 104 corresponds to line 1610. If node 128 sends a TP data packet to node 104 via server 124, then the initial transmission is indicated by arrow 1600. In response, server node 124 forwards the data packet to node 104 as indicated by arrow 1602. Node 104 will send a TP acknowledgement packet to node 128 after it receives the incoming data packet indicated by arrow 1602.

However, in accordance with many standard transmission protocols, if node 128 does not receive a TP acknowledgement within a predetermined period of time, it will retransmit the data packet at regular intervals, and continue to do so up to some maximum predetermined number of attempts. These retransmissions are schematically illustrated by arrows labelled "TP Data Packet" between node 128 and server node 124. The time delay between such requests is typically on the order of 1 to 2 seconds in an enterprise network, but the typical round trip time of a packet followed by its acknowledgment may be much longer over a wireless WAN. Thus, if the server node 124 were to retransmit the data packet in response to each retransmission request, the repeated retransmissions would cause excessive traffic and severely degrade the performance of the wireless WAN.

Consequently, the inventive optimization layer in the server node 124 discards most of the retransmissions and only allows retransmissions to be sent onto the wireless network at some predetermined wireless network dependent interval, for example every 20 seconds as illustrated by data retransmission arrow 1604.

Figure 17A:
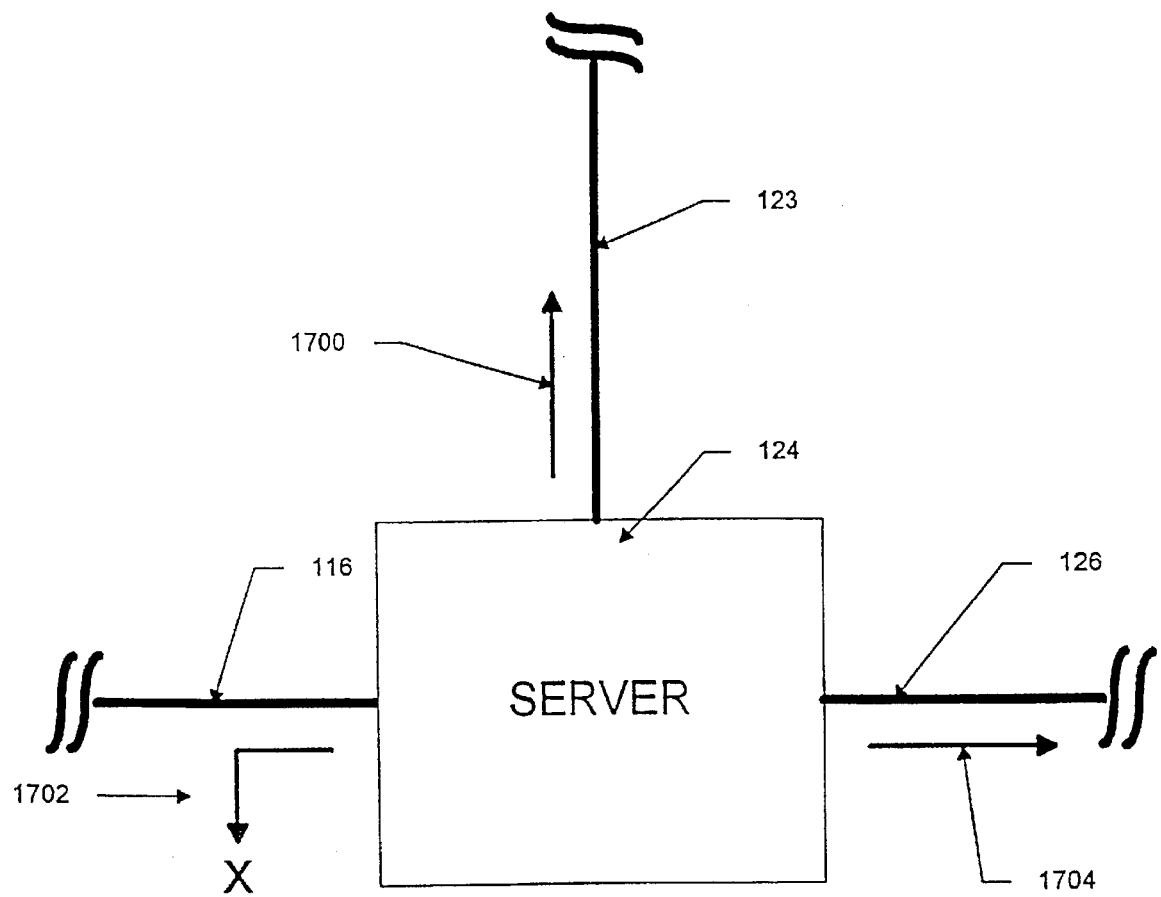
FIG. 17A is a schematic illustration of another example of packet filtering performed in accordance with one aspect of the present invention.

Another example of where packet filtering can be used in accordance with the invention is with broadcast data packets. Broadcast data packet suppression is illustrated in FIG. 17A where a portion of the enterprise network in FIG. 1 is shown comprising the server 124, network segments 123 and 126 and land link 116. The server 124 issues broadcast router requests on the network segments 123 and 126 as indicated by arrows 1700 and 1704. However, the broadcast information is not sent to the wireless network over landline 116, but instead discarded as indicated by arrow 1702. Network traffic over the wireless WAN is thus reduced.

Figure 17B:
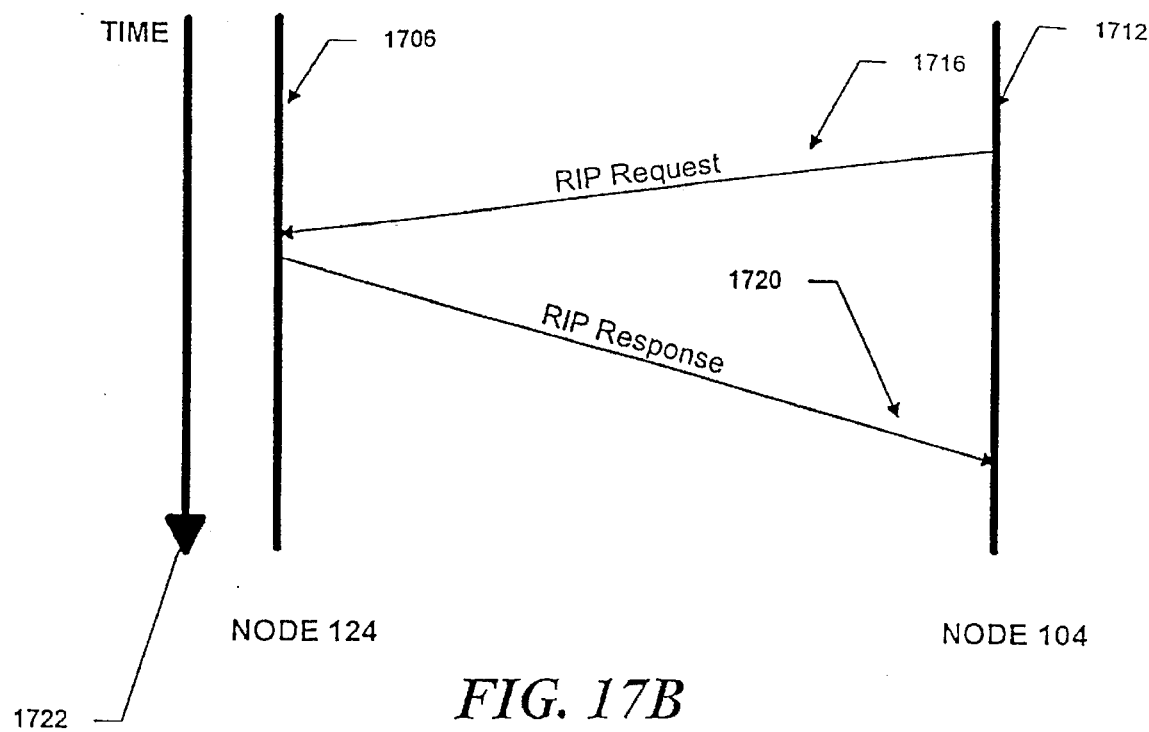
FIG. 17B is a schematic illustration of still another example of packet filtering performed in accordance with one aspect of the present invention.
Figure 17C:
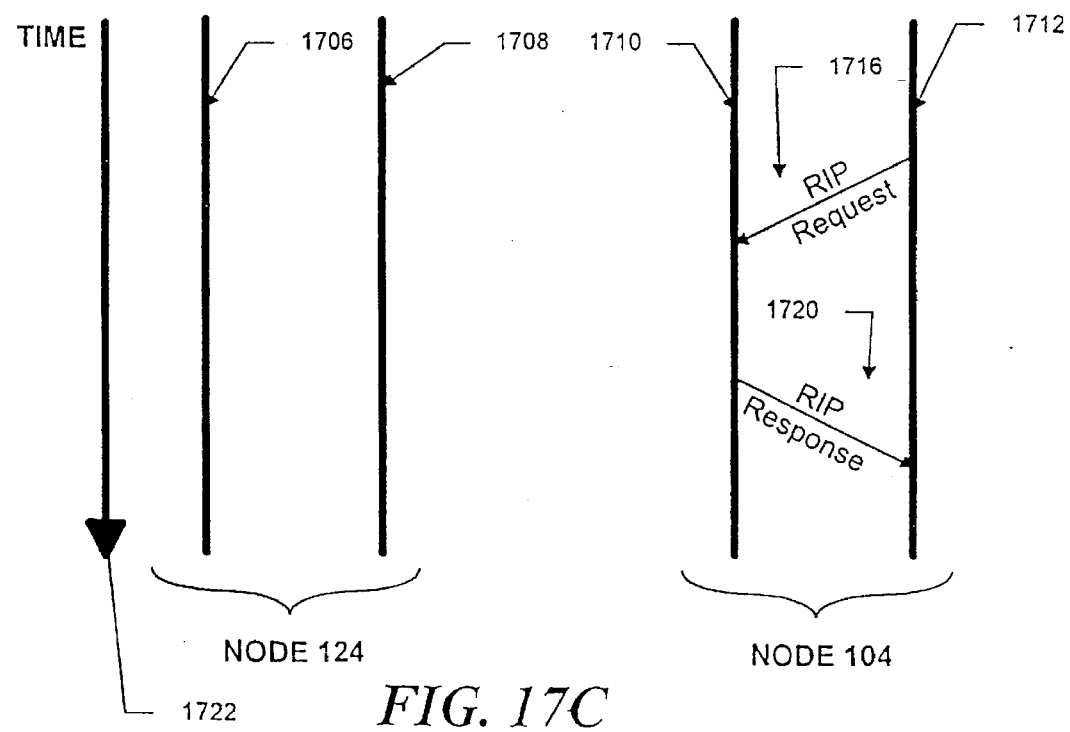
FIG. 17C is a schematic illustration of a further example of packet filtering performed in accordance with one aspect of the present invention.

It is also possible to reduce network traffic by synthesizing certain responses such as routing information request responses. More specifically, in a typical transmission system, if a first node wishes to establish a connection to a second node, the first node issues a routing information request packet to get the address of a router to which it should send subsequent data packets. With wireless WAN networks there is typically one host computer connected to the network to which all of the mobile clients communicate, consequently, the router request is unnecessary as all traffic must pass through this host computer. The optimization layer can intercept an incoming router request packet and generate an appropriate request response packet as if the response packet had come from a router. This operation is illustrated in FIGS. 17B and 17C. FIG. 17B illustrates a routing information packet (RIP) transmission between a client node 104 located on a wireless network (not shown) and a server node 124 located on an enterprise network (not shown) when RIP response synthesis is not used. The RIP requests and RIP responses are shown as a function of time which increases in the direction of arrow 1722.

In FIG. 17B, vertical line 1706 represents the standard protocol stack in the server node 124. For simplicity, the following description assumes that the standard protocol stack 1706 is contained in the server node, although it could be anywhere on the enterprise network. Similarly, vertical line 1712 represents the standard protocol stack in the client node 104.

Operation begins when the client node 104 issues an RIP request packet 1716 from the standard protocol stack 1712. In accordance with the typical operation of such a system, without an optimization module, this request is forwarded over the wireless network. The server node protocol stack 1706 receives the request packet 1716 and, in response, it sends an RIP response packet 1720 back to the standard protocol stack 1712. This transaction results in wireless network traffic consisting of the packets 1716 and 1720.

In accordance with one aspect of the invention and, as described above, there is typically one host computer connected to the wireless network to which all of the mobile clients communicate, consequently, the optimization layer 1710 can intercept an incoming router request packet. This latter operation is shown in FIG. 17C which illustrates a RIP request packet transmission which is handled internally within the client node 104. In FIG. 17C, vertical line 1706 represents the standard protocol stack in the server node 124 and vertical line 1708 represents the inventive optimization module in the server node 124. Vertical lines 1710 and 1712 represent the optimization module and the standard protocol stack in the client node 104, respectively.

In accordance with the principles of the invention, the client node 104 issues an RIP request 1716 from the standard protocol stack 1712 to its optimization module 1710. Optimization module 1710 recognizes that the RIP request is for the wireless network (not shown) and "synthesizes" an RIP response packet 1720 which is returned to the standard protocol stack 1712. Thus, no network traffic is generated over the wireless network (not shown).

Similarly, many data packets containing "name service" and broadcast information can be suppressed. The messages which are to be filtered can be detected by examining various fields in the header, for example, the destination node address and the destination socket address, for predetermined values which indicate that these messages are not appropriate for the wireless network.

Figure 18A:
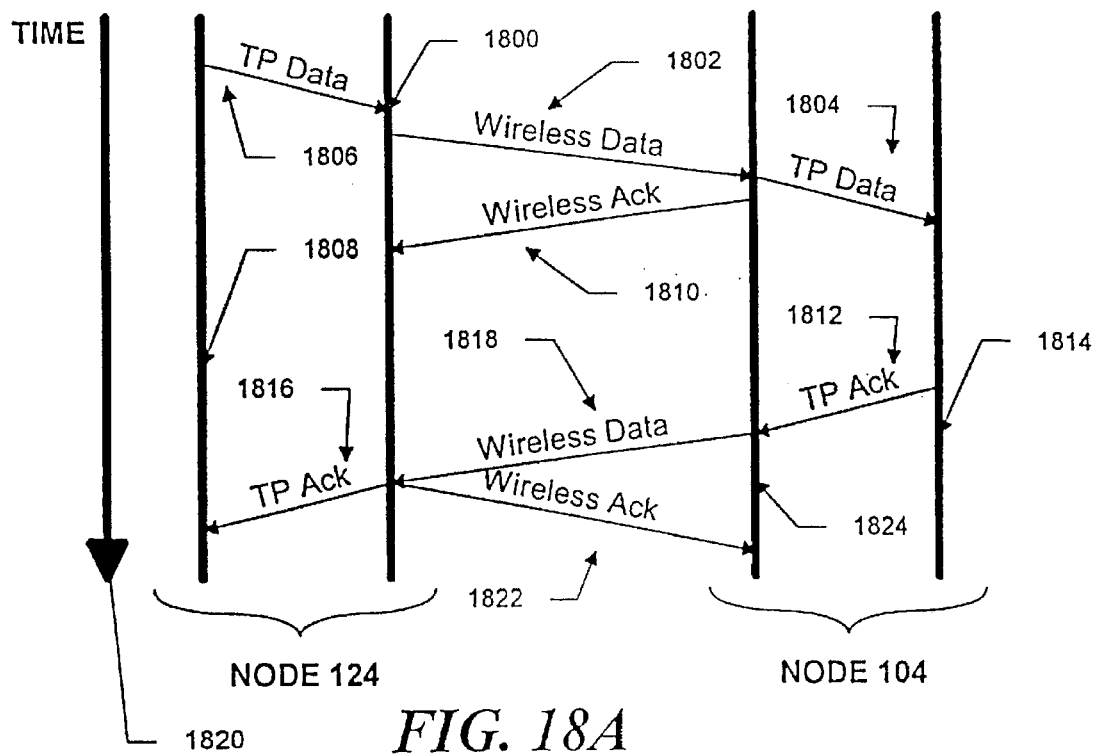
FIG. 18A is a schematic illustration of a data transmissions and acknowledgements in a transmission between a node and server where packet "synthesizing" is not preformed.
Figure 18B:
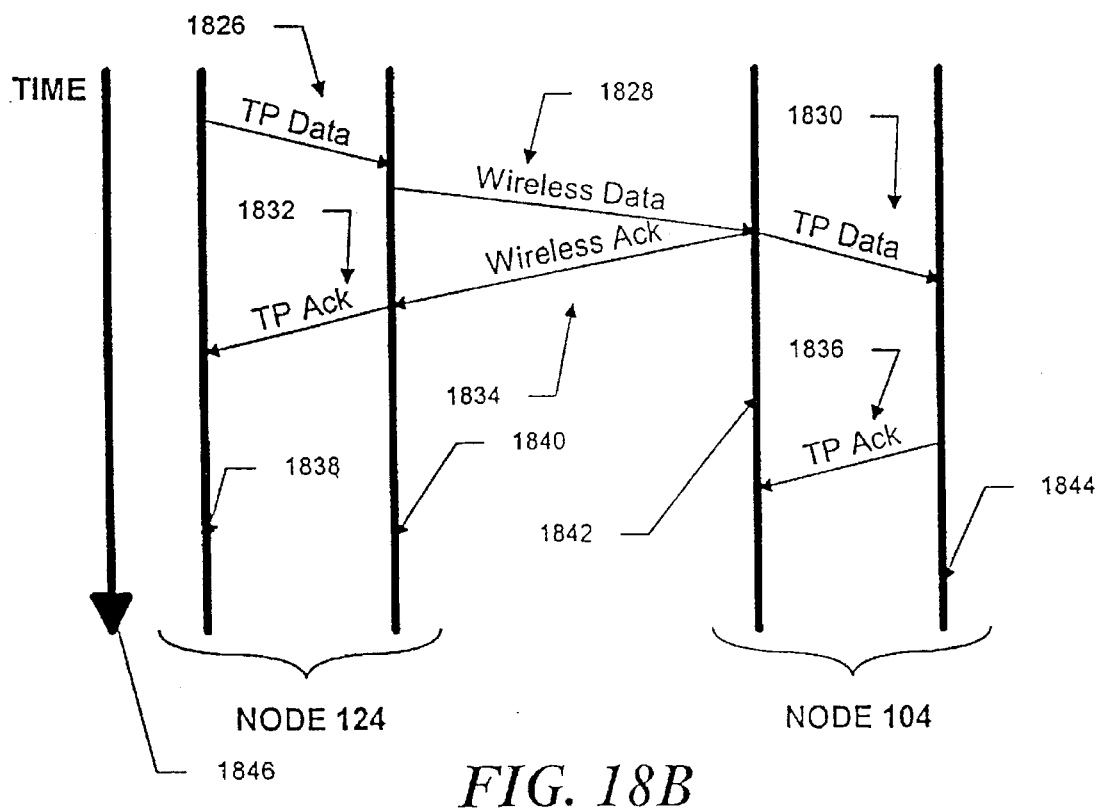
FIG. 18B is a schematic illustration of an example of packet "synthesizing" performed in accordance with one aspect of the present invention.

In addition, the protocol used in some wireless WAN's provides a positive acknowledgement to a transmitted data packet. In networks where this acknowledgement is generated, the illustrative optimization layer can use it in place of the normal TP acknowledgement packet which is returned to the source node. In this situation, the optimization layer will "synthesize" the generation of an TP acknowledgement packet after the optimization layer receives the wireless protocol acknowledgement. The optimization layer will also discard the actual TP acknowledgements without transmitting them over the wireless network, thereby also reducing the network traffic. This latter operation is illustrated in FIGS. 18A and 18B. FIG. 18A illustrates a typical data packet transmission between a server node 124 located on an enterprise network (not shown) and a client node 104 located on a wireless network (not shown). The data transmissions and acknowledgements are shown as a function of time which increases in the direction of arrow 1820.

In FIG. 18A, vertical line 1808 represents the standard protocol stack in the server 124 and vertical line 1800 represents the media specific layer which handles the wireless network protocol in the server 124. As with FIGS. 17B and 17C, the following description assumes that the standard protocol stack 1808 is contained in the server node, although it could be anywhere on the enterprise network. Similarly, vertical lines 1824 and 1814 represent the media specific layer and the standard protocol stack in the client node 104, respectively.

Operation begins when a TP data packet is sent by a standard protocol stack 1808 in the server to the media specific layer 1800 in the server 124 as illustrated by arrow 1806. In response, in accordance with typical network operation, the media specific layer would send a wireless data packet over the wireless network (not shown) as illustrated by arrow 1802. In the particular wireless network of FIG. 18A, when the data packet reaches the media specific layer 1824 in node 104, a TP data packet is sent on to the peer standard protocol stack 1814, as illustrated by arrow 1804, and a wireless acknowledgement packet is sent back to the server 124 over the wireless network, as illustrated by arrow 1810.

The media specific layer 1800 in the server node 124 receives the incoming wireless acknowledgement packet illustrated by arrow 1810. However, upon receiving the original TP data packet represented by arrow 1804, the standard protocol stack 1814 in the client node 104 returns a TP acknowledgement packet to the media specific layer 1824 as illustrated by arrow 1812. This latter packet results in the media specific layer 1824 transmitting a wireless data packet containing the acknowledgement to the server 124 as illustrated by arrow 1818.

When this "data" packet reaches the media specific layer 1800 in the server 124, the media specific layer 1800 transmits a wireless acknowledgement packet back to the client node 104 as illustrated by arrow 1822 and a TP acknowledgement is forwarded to the standard protocol stack 1808 as illustrated by arrow 1816. Thus, the conventional operation results in four messages (1802, 1810, 1818 and 1822) being sent over the wireless network.

FIG. 18B illustrates operation of the networks in accordance with one aspect of the invention. FIG. 18B illustrates a data packet transmission between a server node 124 located on an enterprise network (not shown) and a client node 104 located on a wireless network (not shown). The data transmissions and acknowledgements are shown as a function of time which increases in the direction of arrow 1846. As with FIG. 18A, in FIG. 18B, vertical line 1838 represents the standard protocol stack in the server node 124. However, in accordance with the invention, vertical line 1840 represents the optimization module in the server node 124. Similarly, vertical lines 1842 and 1844 represent the optimization module and the standard protocol stack in the client node 104, respectively. The media specific layers, 1800 and 1824, which were present in the previous diagram are not shown for clarity. However, these layers are used to transfer packets to and from the wireless network.

Operation begins when a TP data packet is sent by the standard protocol stack 1838 in server node 124 to the peer protocol stack 1844 in the client node 104. The TP data packet is sent by the standard protocol stack 1838 in the server 124 to the optimization module 1840 in the server node 124 as illustrated by arrow 1826. In response, a wireless data packet is sent over the wireless network by means of the media specific layers (not shown), as illustrated by arrow 1828. When the data packet reaches the optimization module 1842 in the client node 104, a TP data packet is sent on to the standard protocol stack 1844 in the client node 104 and a wireless acknowledgement packet is sent back to the server node 124 as illustrated by arrows 1830 and 1834, respectively.

However, in accordance with the invention, in response to the returning wireless acknowledgement packet 1834, the optimization module 1840 in the server node 124 "synthesizes" a TP acknowledgement packet and forwards it to the standard protocol stack 1838 as illustrated by arrow 1832.

In addition, when the client node standard protocol stack 1844 receives the incoming TP data packet, it generates a TP acknowledgement packet and returns it to the optimization layer 1842 in the client node 104 (indicated by arrow 1836). In accordance with an aspect of the invention, this incoming acknowledgement packet is not forwarded over the wireless network, but is instead intercepted and discarded by the optimization layer 1842. Thus, the inventive operation results in only two data packets being forwarded over the wireless network as compared to four packets in the previous case.

Further, it is also possible, together with the above-noted reductions and filtering, to compress an entire data packet, including the reduced header and user data, according to a known algorithm such as the ZIV-LEMPEL algorithm or its variants to provide lossless data compression. Such compression techniques are well-known to those skilled in the art and will not be described further hereinafter.

Figure 19:
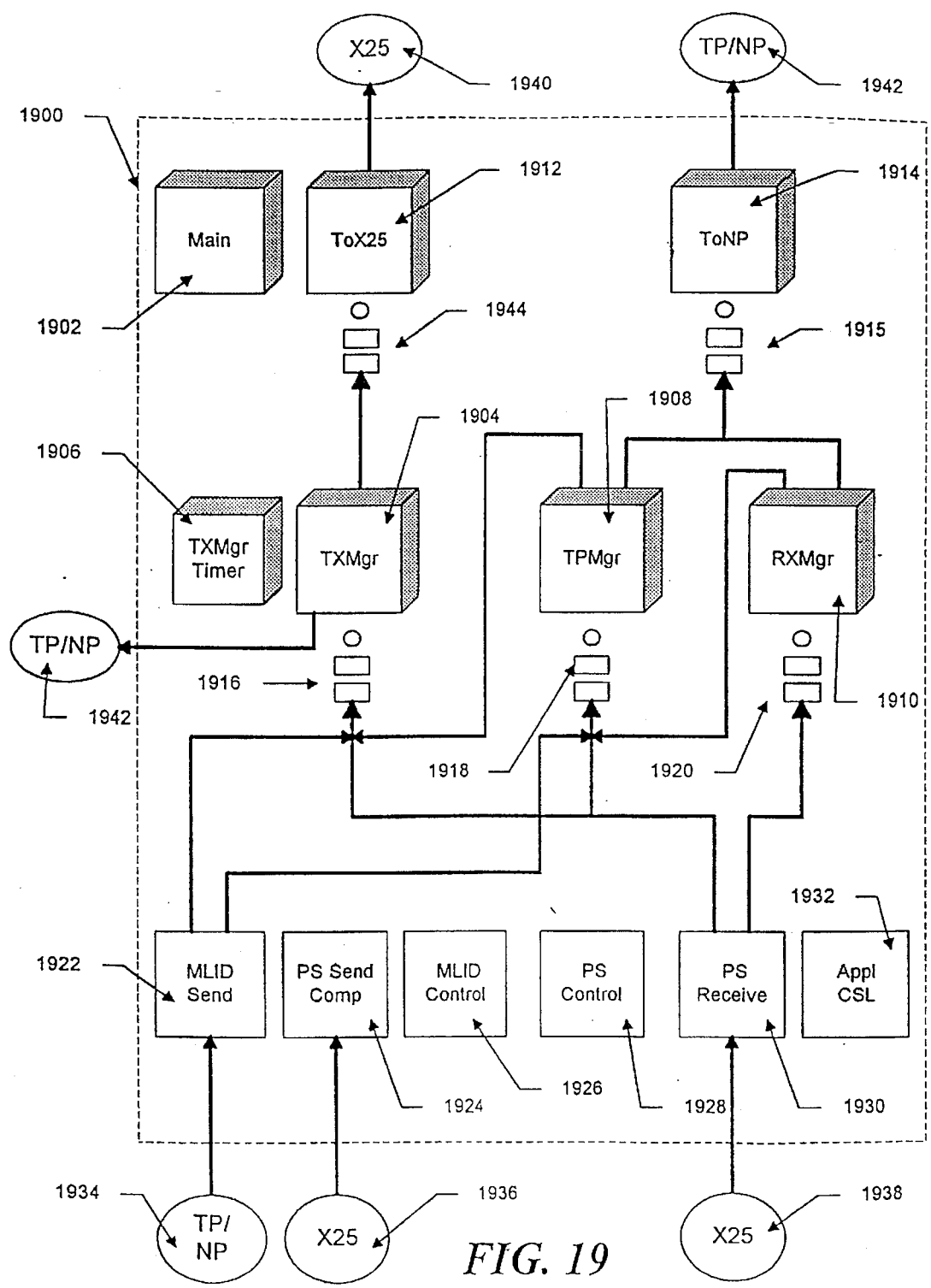
FIG. 19 is a block schematic diagram illustrating the various software programs running in a server optimization layer constructed in accordance with the present invention which performs data processing and optimization and compression to allow the data packets to be efficiently used over a wireless WAN.

The optimization layers 912 and 1012 are comprised of a plurality of programs which operate on data packets flowing through the layers. Each optimization layer is provided with two interfaces so that it connects transparently with existing programs. The construction and data flow in both optimization layers 912 and 1012 is similar and, accordingly, only one layer will be discussed in detail for clarity. FIG. 19 shows the internal software structure and data flow pattern within the server optimization layer 1012. As shown in FIG. 19, the optimization layer consists of a number of "threads" and a number of "entry points" which are called by other programs. The "threads" are independent programs that run semi-autonomously and each thread generally includes an buffer queue and a semaphore. The buffer queue stores data packets for processing by the thread and, when a data packet is placed in the queue, the semaphore is set by the program placing the data packet in the queue. The semaphore, in turn, is a "flag" which is examined by the associated thread and when the semaphore is set, it causes the associated thread to begin processing the data packet or packets in the buffer queue. The buffer queues and associated semaphores are shown schematically as a set of boxes such as queue 1944.

The threads used in the server optimization layer 1900 are the main thread 1902 (Main); the transmission manager thread 1904 (TXMgr); the transmission management time, 1906 (TXMgr Timer); the TP manager thread 1908 (TPMgr); the receive manager thread 1910 (RXMgr); the X.25 output thread 1912 (ToX25) and the NP output thread 1914 (ToNP). It is possible that there may be more than one queue for each semaphore associated with a thread. For example, for the transmission manager (TXMgr) semaphore there is a queue for outgoing NP packets and another queue for incoming wireless PDU acknowledgements. In the case of multiple queues priority is given to the incoming messages.

The optimization layer entry points are the MLIDSend entry point 1922; the MLIDControl entity point 1926; the PSSendComplete entry point 1924; the PSReceive entry point 1930; the PSControl entry point 1928 and the ApplCSL entity point 1932. As will be discussed below, these entry points are designed to make the optimization layer 1900 emulate both a LAN driver and a protocol stack causing the optimization layer to appear as a LAN driver to the TP/NP protocol stack and as a protocol stack to the X.25 LAN driver.

The main thread 1902 (Main) creates the local semaphores and starts up all the other threads. It sets up a routine which will be called when the optimization layer is unloaded and it also initializes any queues and performs any initializations that are required by the protocol stacks and drivers that the optimization layer is emulating. After initialization, the Main thread 1902 can terminate as it has no further functions to perform.

The function of the transmission manager thread 1904 (TXMgr) is to process outgoing TP and NP data packets by calling the filtering and data compression routines used in accordance with the invention. As previously mentioned, the filtering routine indicates whether a particular data packet is to be discarded or sent and the compression routine overwrites the original TP/NP header and data with new information which corresponds to a wireless PDU header followed by a reduced or tokenized TP/NP header and the original TP/NP data. Accordingly, the TXMgr buffer queue 1919 can receive inputs from the MLIDSend entry point 1922 corresponding to data packets received from the TP/NP protocol stack 1934, from the PSReceive entry point 1930 corresponding to data packets received from the X.25 LAN driver 1938 or TP packets from the TPMgr thread 1908. The TXMgr thread 1904 forwards the processed data packets to the buffer queue 1944 of the ToX25 thread 1912 which is described below. The TXMgr thread 1904 also communicates directly with the TP/NP stack 1942 to return buffers holding the incoming information to the TP/NP stack 1942.

Timeouts which occur during the processing of incoming data packets are handled by the transmission manager timer thread 1906 (TXMgr Timer). This thread "wakes up" periodically and checks for expirations and carries out, any expiration processing that is necessary.

The transmit manager thread 1904 (TXMgr)includes a transmit filtering and data compression program (not shown in FIG. 19) which is called to determine if a data packet should be filtered out and to compress data packets which are to be sent. As previously mentioned, certain data packets are not sent over the wireless network and the transmit filtering program modifies a status bit in the data packet indicating whether that packet is to be discarded or whether it is to be sent on to the wireless network. The filtering function is applied on the uncompressed packets before the compression routine is applied.

After filtering, a compression routine is called by the transmit manager thread TXMgr 1904 to compress the packets before transmission as described above and to release the data buffer containing the original data and the TP/NP header. The incoming data is copies into another data buffer and the data compression occurs "in place" in this latter buffer with the original data and header information being lost.

The receive manager thread 1910 (RXMgr) calls a decompressor routine to strip the wireless PDU header from an incoming data packet (received via its buffer queue 1920 and PSReceive entry point 1930 from the X.25 driver 1938) and to decompress the data and reconstruct the TP/NP header as discussed above. Decompression occurs "in place" and the existing data and header of the original compressed data is thereby lost. The receive manager thread 1910 then determines if the data packet is an NP packet which should be forwarded to the ToNP thread 1914 or is a TP packet which should be forwarded to the TPMgr thread 1908 (both described below) by examining the NP header of the reconstructed data packet.

A received data decompression function is called by the receive manager 1910 (RXMgr) to decompress messages received from the wireless network via the X.25 driver 1938. The decompression function is called with a pointer to a buffer containing the received message and returns with the buffer containing the reconstructed NP packet. The decompression also occurs "in place" and overrides the compressed data. During the decompression process, the wireless header information received from the wireless network is removed from the decompressed packet.

The TPMgr thread 1908 receives and processes incoming TP data packets from the receive manager RXMgr thread 1910 via data buffer queue 1918. The TPMgr thread 1908 also receives and processes outgoing TP packets from the TP/NP protocol stack 1934 via entry point 1922. TP packets destined for the wireless network via X.25 driver 1940 are forwarded to the TXMgr thread 1904 via buffer queue 1919 whereas data packets to be forwarded to the TP/NP protocol stack 1942 are provided to the buffer queue 1915 of the ToNP thread 1914 (described below).

If the optimization layer 1900 receives a positive acknowledgement from the wireless network for a sequenced data packet, then the TPMgr 1908 will create a data packet which looks like an TP acknowledgement and forward it, via buffer queue 1915 and the ToNP thread 1914 to the TP/NP stack 1942. As previously mentioned, all TP acknowledgements for data packets are suppressed and not transmitted over the wireless network. With this latter arrangement, a positive acknowledgement received from the server node indicates that a message was successfully received by the remote radio packet modem and the data link between the remote modem and the client node is assumed to be reliable. The "synthesis" of an acknowledgement is only done at the server side as a positive acknowledgement received by the client only means that the wireless network message switch has received the message and does not mean that the wireless network host has received the message.

The ToX25 thread 1912 receives outgoing data packets via its buffer queue 1944 from the TXMgr thread 1904 and sends the outgoing packet to the X.25 driver 1940. The ToX25 thread 1912 performs the processing and buffering necessary to convert the compressed data packet into the appropriate X.25 format.

The ToNP thread 1914 receives incoming, decompressed data packets via buffer queue 1915 from either the RXMgr thread 1910 (NP packets) or the TPMgr thread 1908 (TP packets) received from the X.25 driver and sends the incoming data packets to the local TP/NP stack 1942. In addition, an LSL routine (not shown) is called which will, in turn, call an TP/NP stack routine that queues the incoming data packet and signals the local application through a predefined semaphore (not shown) that a data packet has arrived.

The MLIDControl entry point 1926 is called by the TP/NP protocol stack 1934 in response to a user request and receives various configuration parameters, such as board members, and returns various configuration and statistical values. These functions are required by the TP/NP protocol stack and allow the optimization layer to emulate an X.25 LAN driver.

The PSControl entry, point 1928 and the MLIDSend entry point 1922 are also called by the TP/NP protocol stack 1934 in response to user requests; the former returns information concerning the protocol stack configuration and the protocol stack statistics, while the latter returns the addresses of data buffers containing data packets to be queued for processing to the TXMgr and TPMgr threads, 1904 and 1908, respectively. These functions are also required by the TP/NP protocol stack and allow the optimization layer to emulate an X.25 LAN driver. Similarly, the PSReceive entry point 1930 relays incoming data packets to the receive manager RXMgr 1910 and acknowledgement data packets to the transmit manager thread TXMgr 1904.

The ApplCSL entry point 1932 and the PSSendComplete entry point 1924 are called by the X.25 driver 1938 when establishing and terminating an X.25 virtual circuit. The ApplCSI, entry point 1932 receives various X.25 parameters and returns other X.25 parameters. The PSSendComplete entry point 1924 is called by the X.25 driver when the driver has finished with an outgoing data packet and is used to release the associated buffer memory. These entry points are required to set up and maintain an outgoing X.25 virtual circuit and to make the optimization layer appear as an TP/NP protocol stack.

The foregoing description has been limited to a specific embodiment of this invention. It will be apparent, however, that variations and modifications may be made to the invention, with the attainment of some or all of its advantages. For example, it will be obvious to those skilled in the art that the present invention can be used with various protocols including, but not limited to various LAN protocols such as the NOVELL NetWare SPX/IPX LAN protocol and the ARDIS and RAM wireless WAN protocols. Therefore, it is the object of the appended claims to cover all such variations and modifications as come within the true spirit and scope of the invention.

What is claimed is:

1. A method of reducing unnecessary traffic over a wireless network, said wireless network including a plurality of wireless devices, said wireless network further comprising at least one base station which allows said wireless devices to communicate with nodes of a non-wireless wide area network (WAN), said method comprising the steps of:

(a) providing an optimization layer on at least one node of said WAN, said optimization layer provided transparently between a standard protocol stack and a media-specific layer of said node, said standard protocol stack configured to communicate with said media-specific layer without the use of said optimization layer;

(b) intercepting a packet from said standard protocol stack with said optimization layer;

(c) passing said packet to said media-specific layer without modification thereto when said packet is not addressed to said wireless network; and (d) discarding said packet to inhibit the transmission of said packet over said wireless network when said packet is both (i) addressed to a wireless device of said wireless network and (ii) of a predetermined type.

2. The method according to claim 1, further comprising the step of:

(e) generating a synthesized response to said packet in said optimization layer and passing said synthesized response to said standard protocol stack when said packet is discarded in step (d), said synthesized response simulating an actual response from said wireless device.

3. The method according to claim 2, wherein said packet comprises a routing information packet.

4. The method according to claim 2, wherein said step of passing said synthesized response to said standard protocol stack prevents said standard protocol stack from attempting to re-send said packet to said wireless device.

5. The method according to claim 2, wherein said synthesized response comprises a synthesized acknowledgement.

6. The method according to claim 1, wherein step (d) comprises discarding a broadcast data packet.

7. The method according to claim 1, wherein step (d) comprises discarding a response packet.

8. The method according to claim 1, wherein said step of providing said optimization layer on said at least one node comprises adding said optimization layer to an existing node of said WAN, said step of adding requiring no modification to protocols of either said standard protocol stack or said media-specific layer.

9. A method of reducing unnecessary traffic over a computer network, said method comprising the steps of:

(a) providing an optimization layer on at least one node of said computer network, said optimization layer provided transparently between a standard protocol stack and a media-specific layer of said node, said standard protocol stack configured to communicate with said media-specific layer without the use of said optimization layer;

(b) intercepting a packet from said standard protocol stack with said optimization layer;

(c) determining, in said optimization layer, whether said packet is of a type which can be discarded to reduce unnecessary traffic;

(d) passing said packet from said optimization layer to said media-specific layer without modification to said packet when it is determined in step (c) that said packet cannot be discarded; and (e) discarding said packet to thereby inhibit the transmission of said packet over said computer network when it is determined in step (c) that said packet can be discarded, said step of discarding comprising generating a synthesized response to said packet and returning said synthesized response to said standard protocol stack.

10. The method according to claim 9, wherein step (c) comprises determining whether said packet is a routing information packet.

11. The method according to claim 9, wherein step (c) comprises determining whether said packet is addressed to a wireless device.

12. The method according to claim 9, wherein step (c) comprises determining whether said packet is addressed to a destination for which the packet is to be discarded.

13. The method according to claim 9, wherein said synthesized response simulates an actual response by a node to which said packet is addressed.

14. A method of suppressing the transmission of a packet across a computer network, said packet generated at least in-pan by a media-independent protocol stack of a source node of said computer network, said method comprising the steps of:

(a) intercepting said packet within said source node as said packet is passed by said media-independent protocol stack to a media-specific protocol layer of said source node;

(b) determining whether said packet is of a type which can be discarded to reduce unnecessary traffic;

(c) passing said packet to said media-specific protocol layer for transmission to a destination node when it is determined in step (b) that said packet cannot be discarded; mid (d) discarding said packet to thereby inhibit the transmission of said packet to said destination node when it is determined in step (b) that said packet can be discarded, said step of discarding comprising generating a synthesized response to said packet and returning said synthesized response to said media-independent protocol stack, said synthesized response simulating an actual response from said destination node.

15. The method according to claim 14, wherein step (b) comprises determining whether said packet is a routing information packet.

16. The method according to claim 14, wherein step (b) comprises determining whether said packet is addressed to a wireless device.

17. The method according to claim 14, wherein step (b) comprises determining whether said packet is addressed to a destination for which the packet is to be discarded.

18. The method according to claim 14, wherein said media-specific protocol layer implements a wireless protocol for transmitting packets to wireless devices.

19. A method of inhibiting acknowledgement traffic between a source node and a destination node of a computer network, said source node and said destination node each comprising a respective standard protocol stack which communicates with a respective media-specific layer, said standard protocol stacks implementing an acknowledgement protocol which uses acknowledgement packets to verify successful transmissions of data packets, said method comprising the steps of:

(a) providing a first optimization layer on said source node, said first optimization layer provided transparently between said standard protocol stack and said media-specific layer of said source node;

(b) providing a second optimization layer on said destination node, said second optimization layer provided transparently between said standard protocol stack and said media-specific layer of said destination node; and (c) when said standard protocol stack of said source node transmits a data packet to said standard protocol stack of said destination node:

(i) intercepting and discarding, with said second optimization layer, an acknowledgement packet generated by said standard protocol stack of said destination node, to thereby suppress the transmission of said acknowledgement packet to said source node, and (ii) generating a synthesized acknowledgement with said first optimization layer and passing said synthesized acknowledgement to said standard protocol stack of said source node, said synthesized acknowledgement simulating said acknowledgement packet discarded in step (i).

20. The method according to claim 19, wherein said destination node is a node of a wireless network.

* * * * *

UNITED STATES PATENT AND TRADEMARK OFFICE
CERTIFICATE OF CORRECTION

PATENT NO. : 5,627,829
DATED : May 6, 1997
INVENTOR(S) : Bryan J. Gleeson, et al.

It is certified that error appears in the above-identified patent and that said Letters Patent is hereby corrected as shown below:

In claim 14, column 24, at line 35, change "in-pan" to --in-part--.

In claim 14, column 24, at line 47, change "mid" to --and--.

Signed and Sealed this

Eighth Day of May, 2001

Attest:

NICHOLAS P. GODICI

Attesting Officer

Acting Director of the United States Patent and Trademark Office